US008749108B2

(12) United States Patent
Dyer et al.

(10) Patent No.: US 8,749,108 B2
(45) Date of Patent: Jun. 10, 2014

(54) TRANSVERSE AND/OR COMMUTATED FLUX SYSTEMS HAVING LAMINATED AND POWDERED METAL PORTIONS

(75) Inventors: John M. Dyer, Flagstaff, AZ (US);
Thomas F. Janecek, Flagstaff, AZ (US);
David G. Calley, Flagstaff, AZ (US);
Daniel S. Cole, Flagstaff, AZ (US);
Tyler K. Williams, Flagstaff, AZ (US)

(73) Assignee: Electric Torque Machines, Inc., Flagstaff, AZ (US)

( * ) Notice: Subject to any disclaimer, the term of this patent is extended or adjusted under 35 U.S.C. 154(b) by 141 days.

(21) Appl. No.: 13/420,576

(22) Filed: Mar. 14, 2012

(65) Prior Publication Data
US 2012/0235519 A1    Sep. 20, 2012

Related U.S. Application Data

(60) Provisional application No. 61/453,075, filed on Mar. 15, 2011.

(51) Int. Cl.
*H02K 1/06* (2006.01)
(52) U.S. Cl.
USPC ................................. 310/216.008
(58) Field of Classification Search
USPC .................. 310/216.001–216.137
See application file for complete search history.

(56) References Cited

U.S. PATENT DOCUMENTS

| 6,765,321 | B2 * | 7/2004 | Sakamoto ............ 310/49.08 |
| 6,791,225 | B2 * | 9/2004 | Campbell et al. ............ 310/181 |
| 2003/0071530 | A1 | 4/2003 | Takahashi |
| 2004/0070304 | A1 * | 4/2004 | Enomoto et al. ............ 310/218 |
| 2007/0013253 | A1 * | 1/2007 | Dubois et al. ............ 310/156.02 |
| 2007/0145834 | A1 | 6/2007 | Usui |
| 2007/0152528 | A1 * | 7/2007 | Kang et al. ............ 310/156.55 |
| 2008/0174189 | A1 | 7/2008 | Boucher et al. |

OTHER PUBLICATIONS

Intl Search Report dated Jan. 21, 2013 of PCT/US2012/044727 filed Jun. 28, 2012 (3 pages).

* cited by examiner

*Primary Examiner* — Hanh Nguyen
(74) *Attorney, Agent, or Firm* — Pillsbury Winthrop Shaw Pittman, LLP

(57) ABSTRACT

An electrical machine comprising a rotor, a coil and a stator comprising a lamination stack coupled to a tooth, wherein the electrical machine is at least one of a transversal flux machine is described. The electrical machine may be a transversal flux machine such as a transverse or commutated flux machine. A lamination ring is described comprising a plurality of lamination stacks. A lamination stack may comprise a plurality of trenches configured to retain a plurality of teeth. The tooth may comprise a portion of the switching surface, and a portion of a lamination stack may extend to the surface of the tooth to make up a portion of the switching surface. The electrical machine may be configured with a constant air gap, wherein no more than 15% variability in the distance between the stator switching surface and the rotor switching surface.

20 Claims, 26 Drawing Sheets

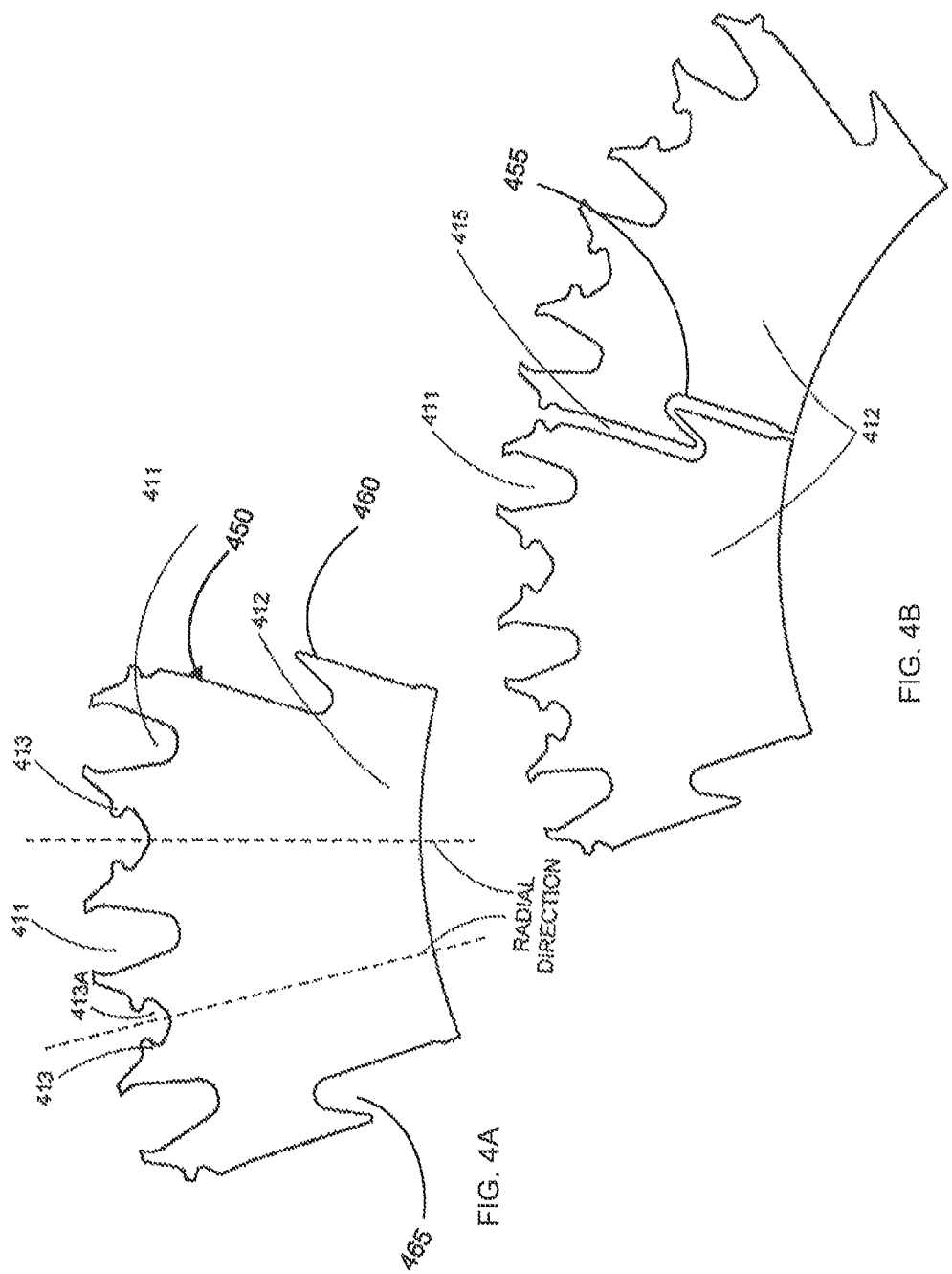

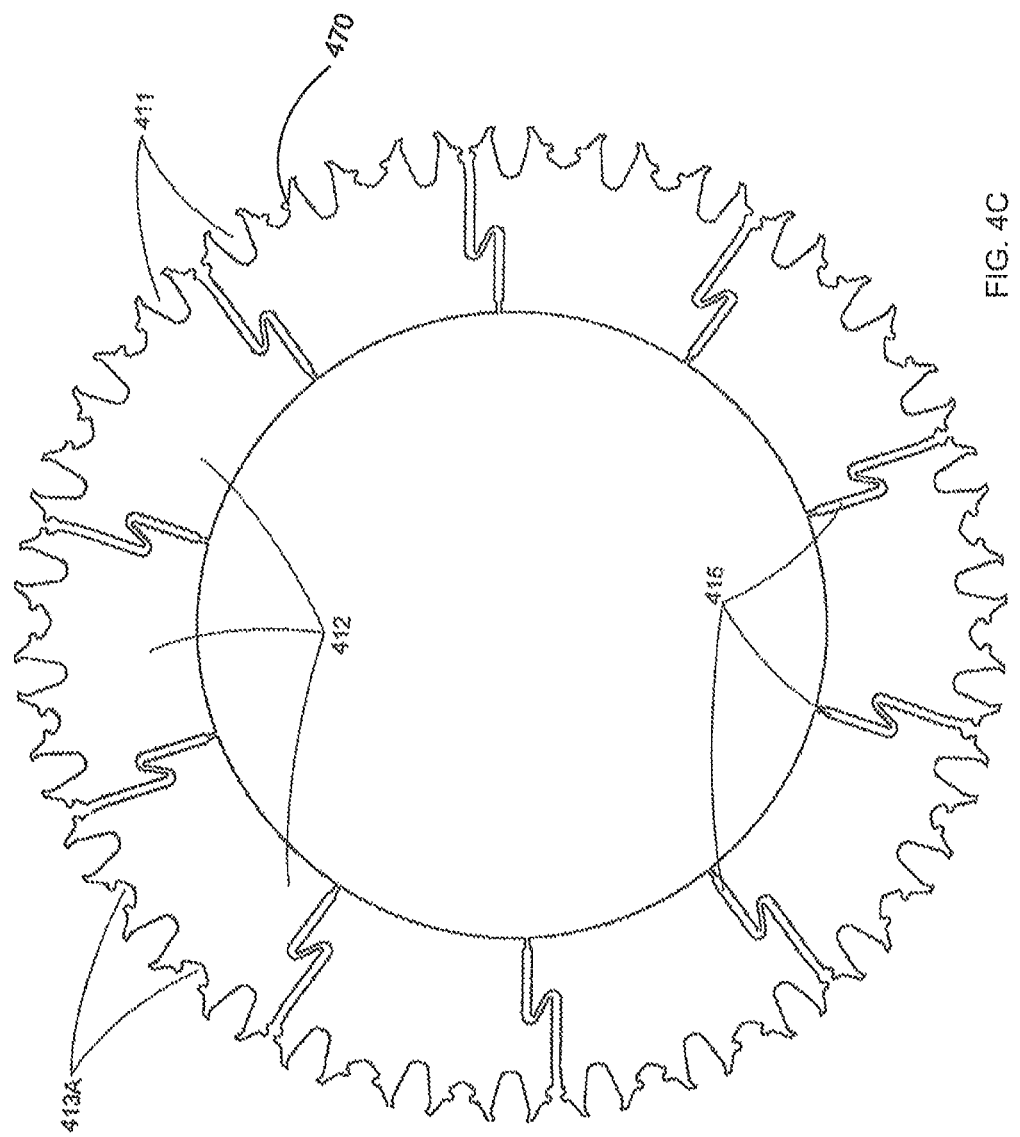

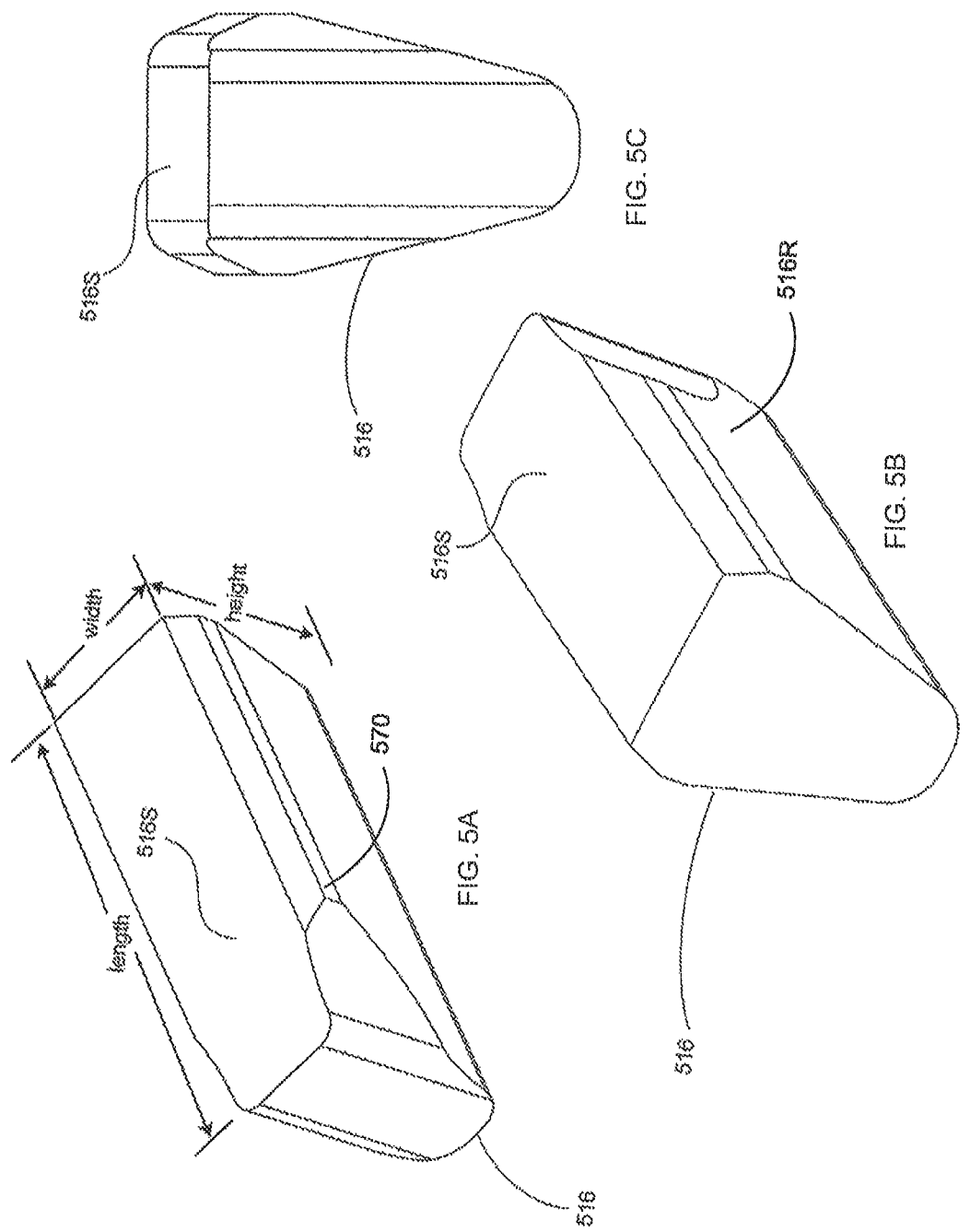

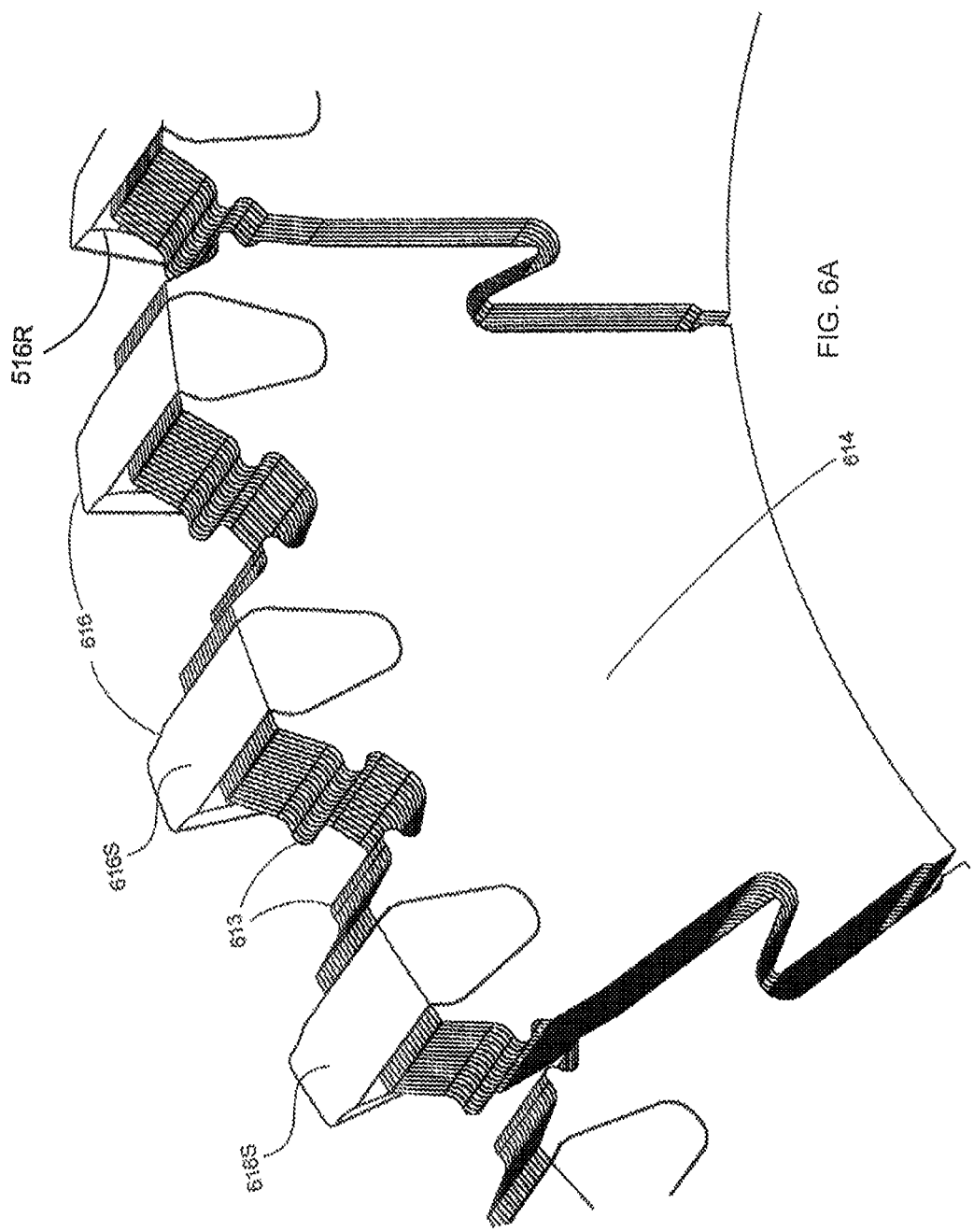

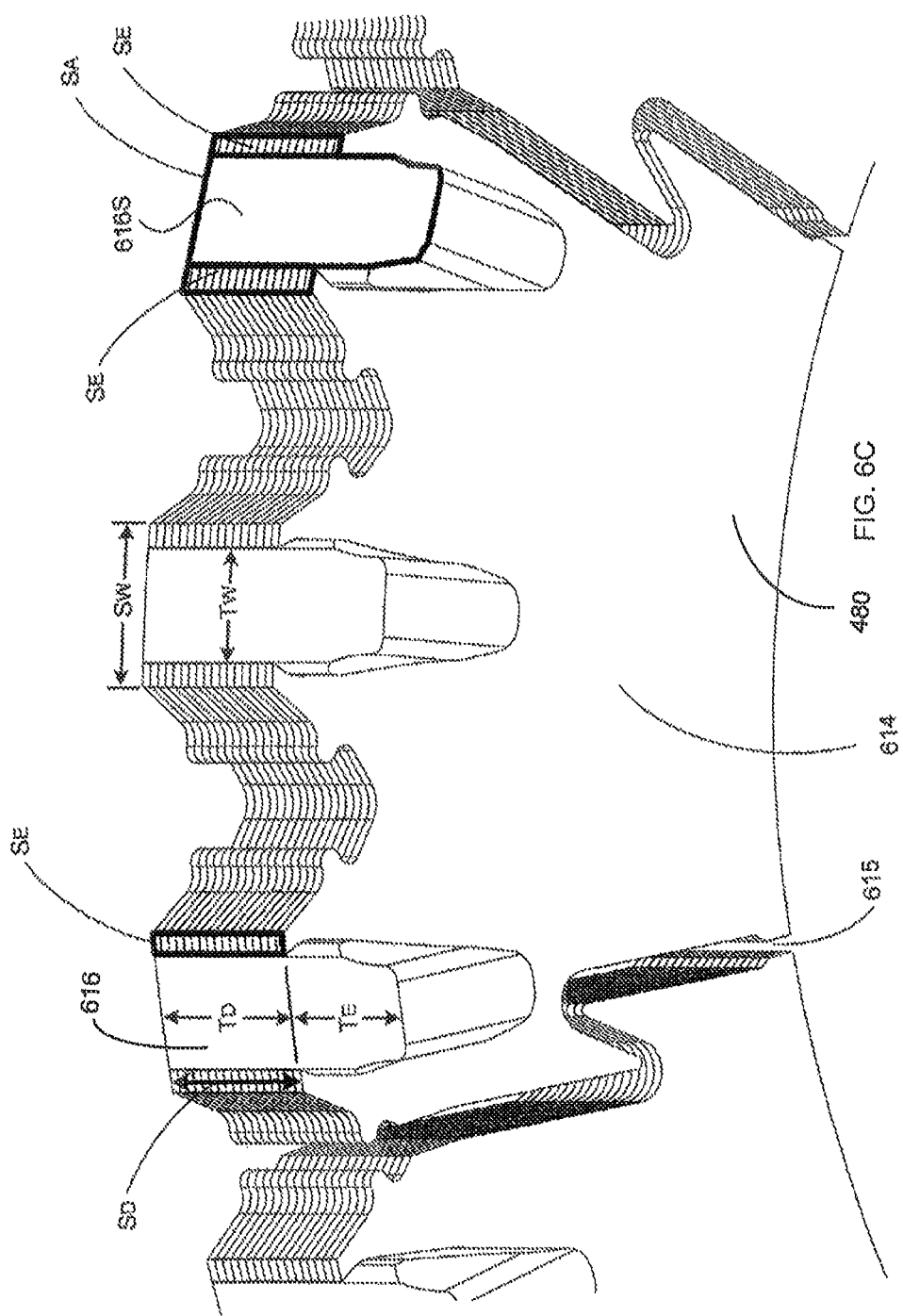

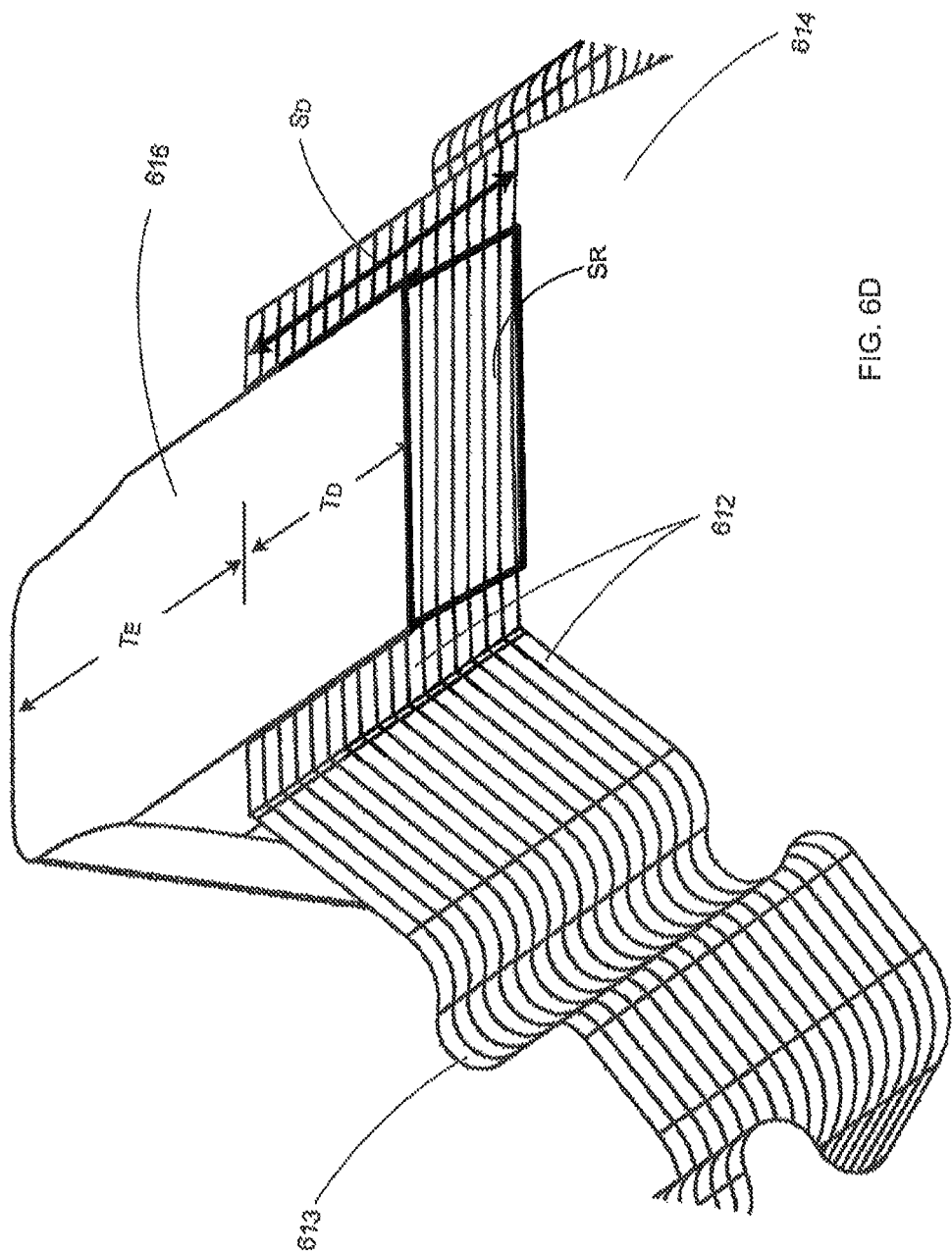

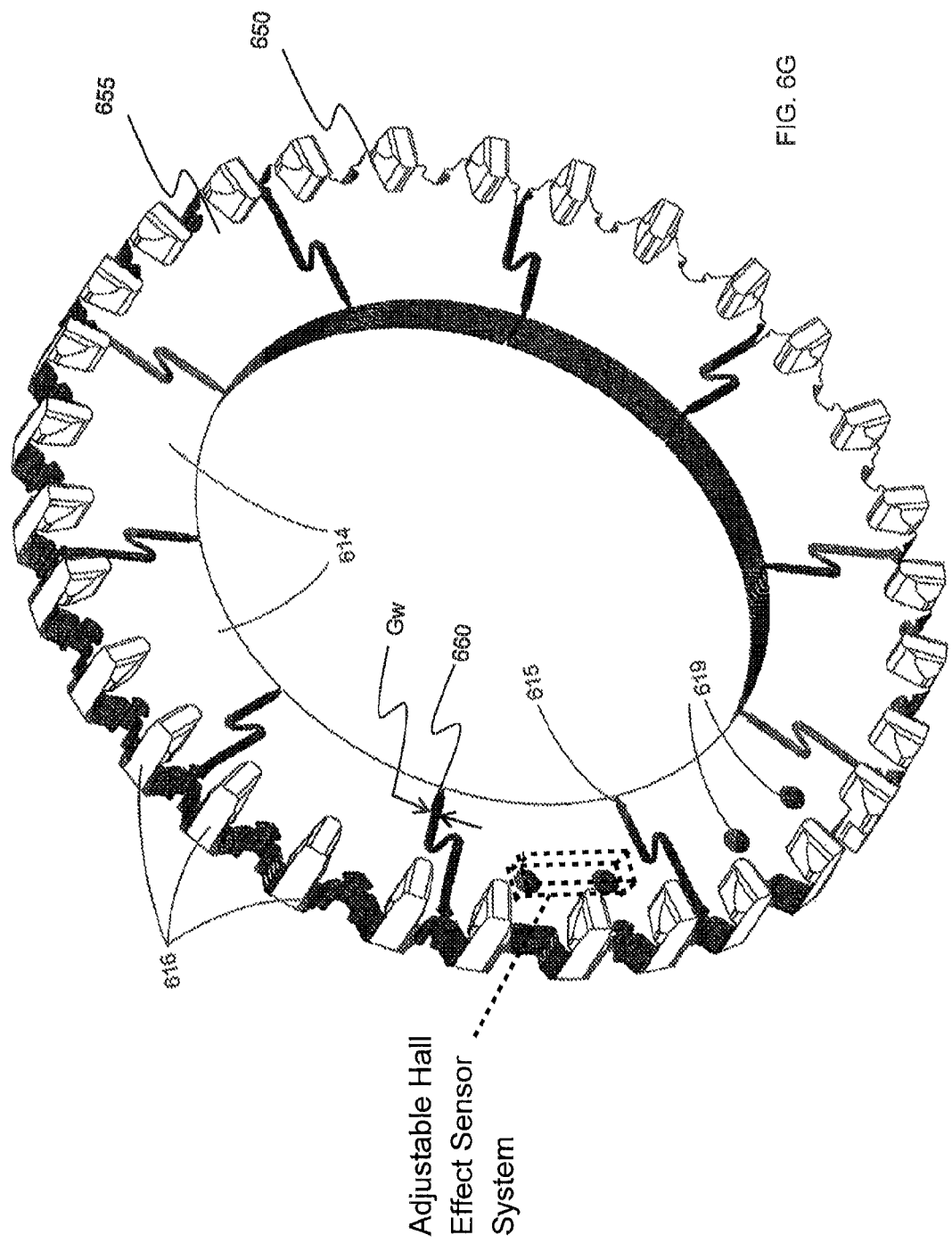

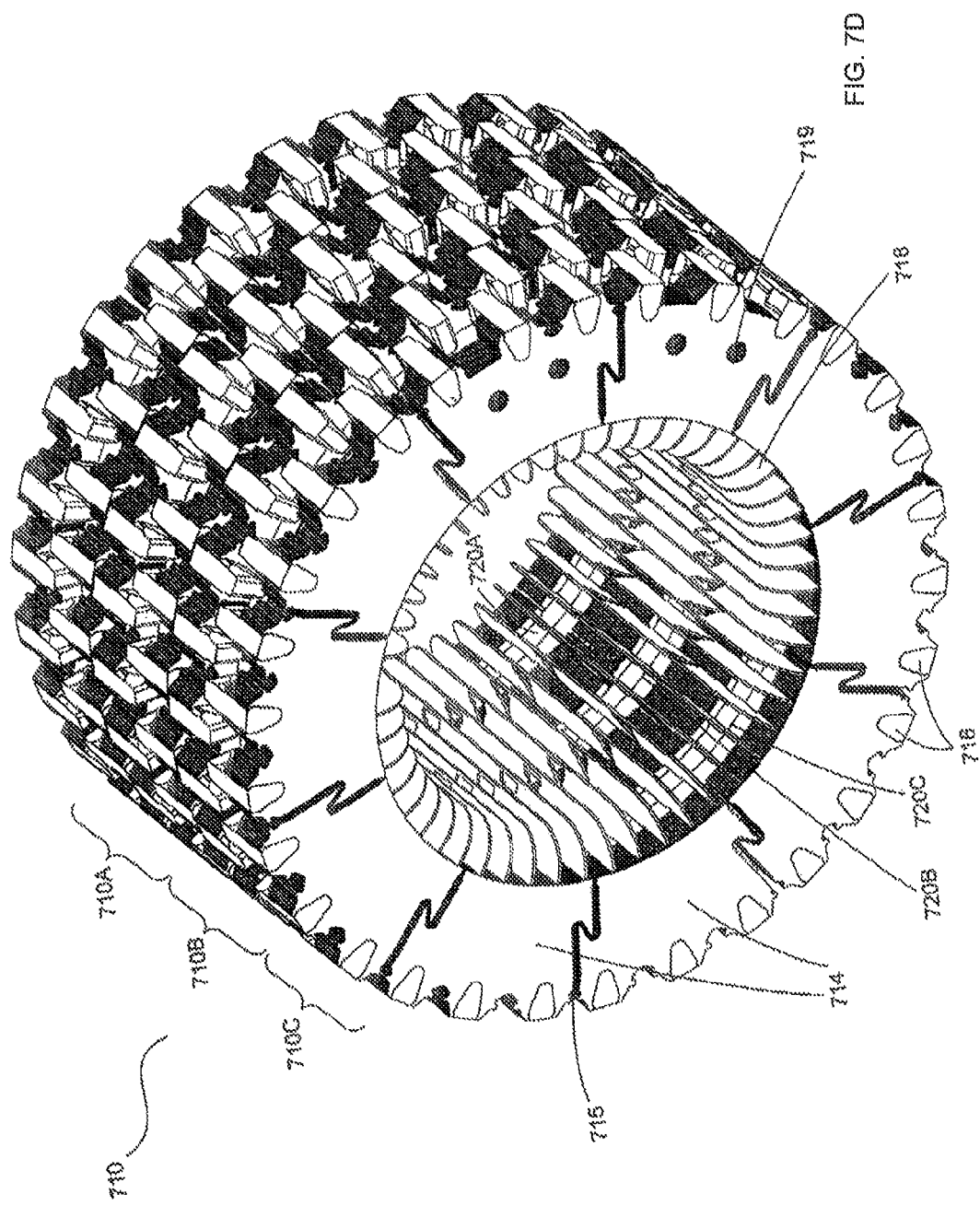

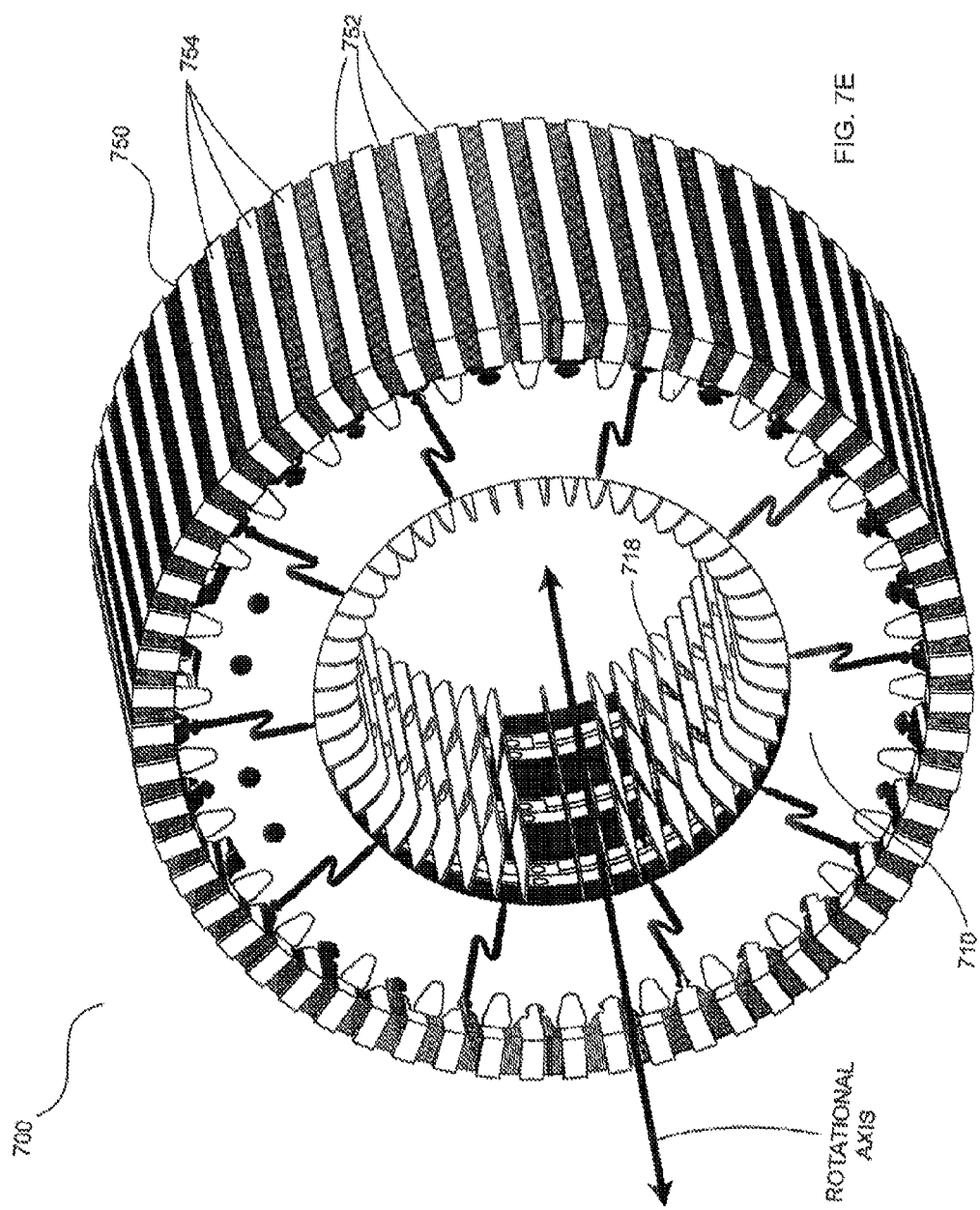

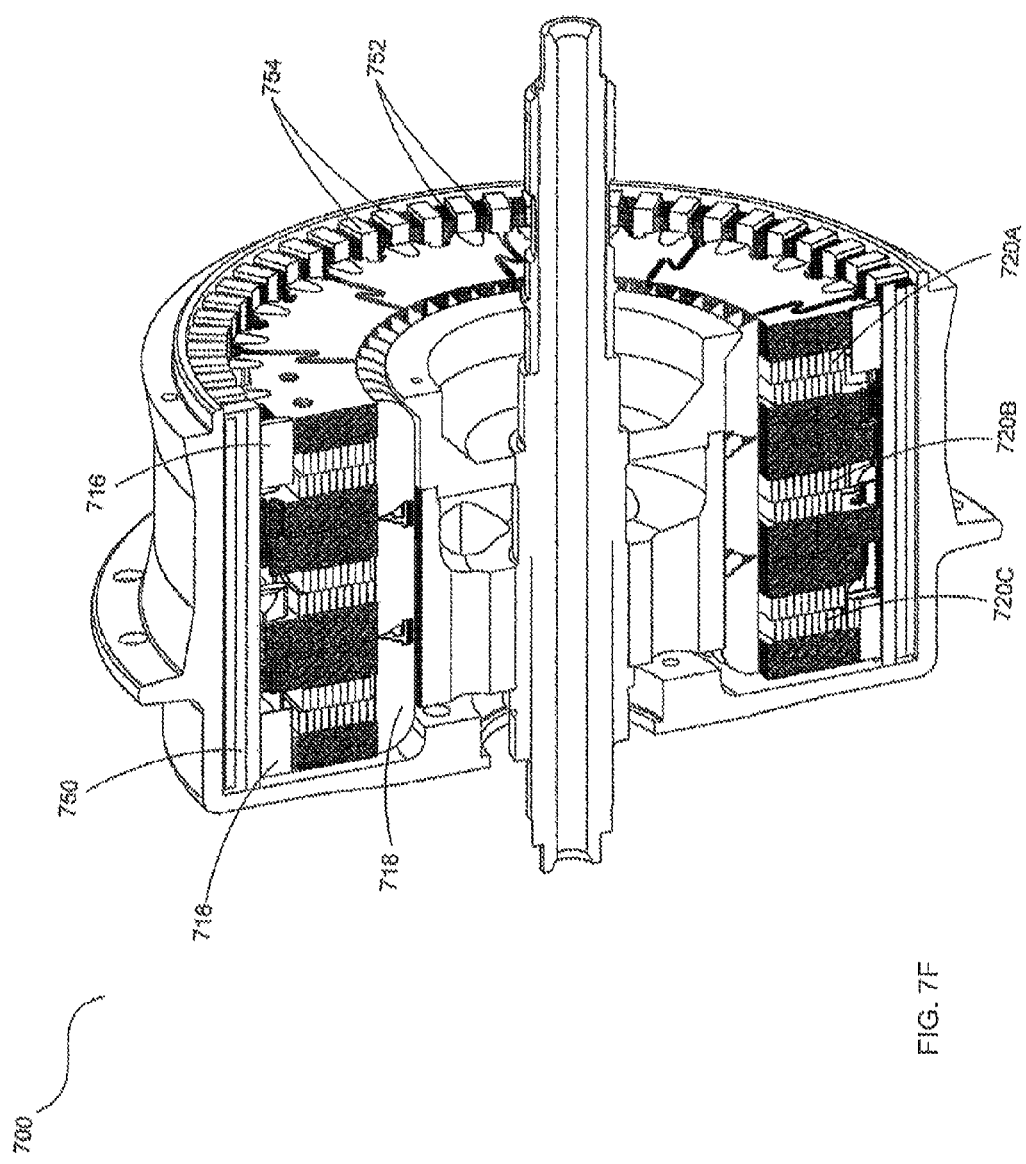

TRANSVERSE AND/OR COMMUTATED FLUX SYSTEMS HAVING LAMINATED AND POWDERED METAL PORTIONS

CROSS-REFERENCE TO RELATED APPLICATIONS

The present invention claims the benefit of U.S. Provisional Patent Application No. 61/453,075, filed on Mar. 15, 2011, which is incorporated by reference herein in its entirety.

TECHNICAL FIELD

The present disclosure relates to electrical systems, and in particular to transverse flux machines and commutated flux machines.

BACKGROUND

Motors and alternators are typically designed for high efficiency, high power density, and low cost. High power density in a motor or alternator may be achieved by operating at high rotational speed and therefore high electrical frequency. However, many applications require lower rotational speeds. A common solution to this is to use a gear reduction. Gear reduction reduces efficiency, adds complexity, adds weight, and adds space requirements. Additionally, gear reduction increases system costs and increases mechanical failure rates.

Additionally, if a high rotational speed is not desired, and gear reduction is undesirable, then a motor or alternator typically must have a large number of poles to provide a higher electrical frequency at a lower rotational speed. However, there is often a practical limit to the number of poles a particular motor or alternator can have, for example due to space limitations. Once the practical limit is reached, in order to achieve a desired power level the motor or alternator must be relatively large, and thus have a corresponding lower power density.

Moreover, existing multipole windings for alternators and electric motors typically require winding geometry and often complex winding machines in order to meet typically made worse. Additionally, as pole count increases, coil losses also increase (for example, due to resistive effects in the copper wire or other material comprising the coil). However, greater numbers of poles have certain advantages, for example allowing a higher voltage constant per turn, providing higher torque density, and producing voltage at a higher frequency.

Most commonly, electric motors are of a radial flux type. To a far lesser extent, some electric motors are implemented as transverse flux machines and/or commutated flux machines. It is desirable to develop improved electric motor and/or alternator performance and/or configurability. In particular, improved transverse flux machines and/or commutated flux machines are desirable, including those configured with laminated and/or powdered metal portions and combinations thereof.

SUMMARY

The invention is directed to an electrical machine comprising a rotor, a coil and a stator comprising a lamination stack coupled to a tooth, wherein the electrical machine is at least one of a transversal flux machine. A transversal flux machine may be a transverse or commutated flux machine as described herein. A transversal flux machine may be configured in any suitable way, including radial gap, axial gap, cavity engage, face engage, and any suitable combinations thereof. In an exemplary embodiment, the transversal flux machine is a transverse flux machine in a radial gap configuration and face engaged. The electrical machine may be a Polyphase machine, and may comprise any other suitable component including a Hall effect sensor and the like.

The electrical machine described herein comprises a lamination stack configured with a flux switch area that is comprised of a surface of the tooth facing the rotor, a first switch edge comprising a portion of the lamination stack disposed on one side of the tooth in a rotational direction of the rotor, and a second switch edge comprising a portion of the lamination stack disposed on the opposite side of the tooth in a rotational direction of the rotor. In an exemplary embodiment, a flux switch area is configured with a switch width (Sw) that is comprises of a tooth width (Tw) and at least one switching edge width (Sew). The tooth width may be any suitable component of the switch width including, but not limited to, no more than 10%, no more than 50%, between 50% and 95%, or any range between these values. Likewise a switch edge width my be any suitable component of the switch width including, but not limited to, no more than 2%, no more than 5%, no more than 10%, no more than 50%, between 50% and 95%, or any range between these values. In an exemplary embodiment, a flux switch area, as described herein, is comprised of at least 10% of a switch edge, and may comprise a first and second switch edge that each make up at least 10% of the switch area.

In an exemplary embodiment, at least one edge of a tooth extending from the switching area is covered by a laminations, and in a preferred embodiment, both edges of a tooth extending from a switching area is covered by laminations.

The electrical machine, as described herein, may comprises laminations having a plurality of trenches to receive a tooth. A trench may be configured to retain a tooth in a radial and/or axial direction and may comprise for example a key, or other geometric feature that is configured to nest with a tooth geometry. In addition, in an exemplary embodiment, a lamination stack comprises a plurality of cavities that are configured to mechanically retain a cured adhesive, such as an epoxy.

The electrical machine described herein may comprise a first stator half that is comprised of a plurality of lamination stacks configured to form a lamination ring. A plurality of teeth may be coupled to the lamination stacks, and the stator may be configured within a rotor. In a first position of the rotor, flux may be transferred from the plurality of teeth to the rotor, and in a second position of the rotor, flux may be transferred from the rotor to the plurality of teeth. In addition, the electrical machine may further comprise a back return lamination coupling a first stator half to a second stator half.

In an exemplary embodiment, the dimensions of a tooth are selected to cause at least a portion of a lamination stack to fully saturate with magnetic flux. Furthermore, a tooth may be tapered in the axial direction to reduce flux leakage. In addition, a stator may comprise a plurality of teeth configured according to a sixth-phase offset.

The electrical machine described herein may be configured in any suitable configuration, including a radial gap or axial gap configuration, and be either face or cavity engaged. In addition, the electrical machine may be configured as an outer rotating electrical machine, whereby the stator is configured within an outer rotor. For example, the stator and rotor may be concentrically configured, with an air gap between the stator switching surface and the rotor switching surface, and the rotor may be oriented outside of the stator in an outer rotating configuration. The electrical machine described herein may also be configured in an inner rotating configuration, wherein the rotor is oriented within a stator. Again, the rotor and stator may be concentrically configured with the rotor within the stator; in an inner rotating configuration.

The electrical machine described herein may be configured with a constant air gap, wherein the distance between the stator switch surface and the rotor switch surface is substantially constant, having no more than 15% variability. The stator and rotor switching surface may be configured with any suitable air gap variability including, but not limited to, no more than about 15%, no more than about 10%, no more than about 5%, no more than about 3%, and any range between and including the air gap variability values provided. In addition, a stator or rotor switching surface may have a smooth configuration, having no protrusions extending more than 4 mm from the surface, in a direction normal to the switching surface. A stator or rotor may be configured with a switching surface with protrusions extending any suitable amount from switching surface including, but not limited to, no more than about 4 mm, no more than about 2 mm, no more than about 1 mm, no more than about 0.5 mm, and any range between and including protrusion dimensions provided.

BRIEF DESCRIPTION OF THE DRAWINGS

With reference to the following description, appended claims, and accompanying drawings:

FIG. 4A is a side view isometric view illustrating a side lamination in accordance with an exemplary embodiment;

FIG. 4B is a side view illustrating side laminations having at least partially interlocking portions in accordance with an exemplary embodiment;

FIG. 4C is a side view isometric view illustrating a generally ring-shaped structure comprising multiple side laminations having at least partially interlocking portions in accordance with an exemplary embodiment;

FIGS. 5A-5C are isometric views illustrating stator teeth in accordance with an exemplary embodiment;

FIGS. 6A and 6B are isometric views illustrating a lamination stack having stator teeth coupled thereto in accordance with an exemplary embodiment;

FIG. 6C is an isometric view illustrating configuration of a lamination stack and stator teeth coupled thereto in accordance with an exemplary embodiment;

FIG. 6D is an isometric view illustrating a stator tooth extending partway through a lamination stack in accordance with an exemplary embodiment;

FIG. 6G is an isometric view illustrating multiple lamination stacks having stator teeth coupled thereto, the multiple lamination stacks and stator teeth forming a generally ring-shaped stator half in accordance with an exemplary embodiment;

FIG. 7D is an isometric view illustrating a polyphase stator assembly for a transverse flux machine in accordance with an exemplary embodiment;

FIG. 7E is an isometric view illustrating a polyphase transverse flux machine in accordance with an exemplary embodiment;

FIG. 7F illustrates, in an isometric view cut-away view, an exemplary polyphase transverse flux machine configured for use as a bicycle motor in accordance with an exemplary embodiment;

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended statements.

For the sake of brevity, conventional techniques for electrical system construction, management, operation, measurement, optimization, and/or control, as well as conventional techniques for magnetic flux utilization, concentration, control, and/or management, may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical electrical system, for example an AC synchronous electric motor.

Various shortcomings of prior electrical machines can be addressed by utilizing transversal flux machines, such as transverse flux machines and/or commutated flux machines configured in accordance with principles of the present disclosure. As used herein, a "transverse flux machine" and/or "commutated flux machine" may be any electrical machine wherein magnetic flux paths have sections where the flux is generally transverse to a rotational plane of the machine. In an exemplary embodiment, when a magnet and/or flux concentrating components are on a rotor and/or are moved as the machine operates, the electrical machine may be a pure "transverse" flux machine. In another exemplary embodiment, when a magnet and/or flux concentrating components are on a stator and/or are held stationary as the machine operates, the electrical machine may be a pure "commutated" flux machine. As is readily apparent, in certain configurations a "transverse flux machine" may be considered to be a "commutated flux machine" by fixing the rotor and moving the stator, and vice versa. Moreover, a coil may be fixed to a stator; alternatively, a coil may be fixed to a rotor.

There is a spectrum of functionality and device designs bridging the gap between a commutated flux machine and a transverse flux machine. Certain designs may rightly fall between these two categories, or be considered to belong to both simultaneously. Therefore, as will be apparent to one skilled in the art, in this disclosure a reference to a "transverse flux machine" may be equally applicable to a "commutated flux machine" and vice versa.

Figure 2A:
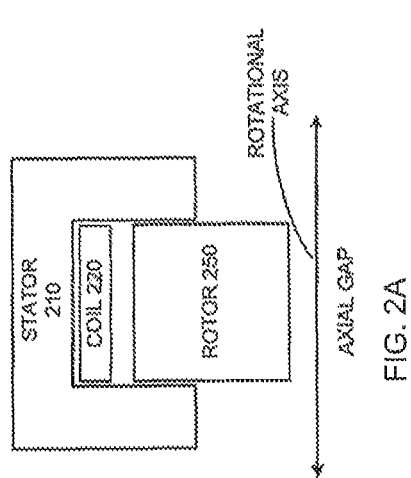
FIG. 2A is a cross-sectional view illustrating an exemplary axial gap configuration in accordance with an exemplary embodiment.
Figure 2B:
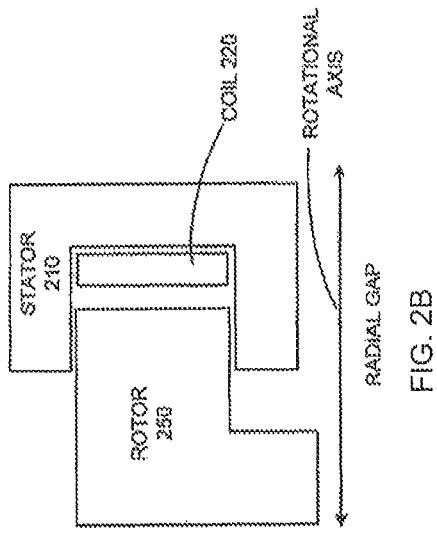
FIG. 2B is a cross-sectional view illustrating an exemplary radial gap configuration in accordance with an exemplary embodiment.

Moreover, transverse flux machines and/or commutated flux machines may be configured in multiple ways. For example, with reference to FIG. 2A, a commutated flux machine may be configured with a stator 210 generally aligned with the rotational plane of a rotor 250. Such a configuration is referred to herein as "axial gap." In another configuration, with reference to FIG. 2B, a commutated flux machine may be configured with stator 210 rotated about 90 degrees with respect to the rotational plane of rotor 250. Such a configuration is referred to herein as "radial gap." Similar approaches may be followed in transverse flux machines and are referred to in a similar manner.

Figure 3A:
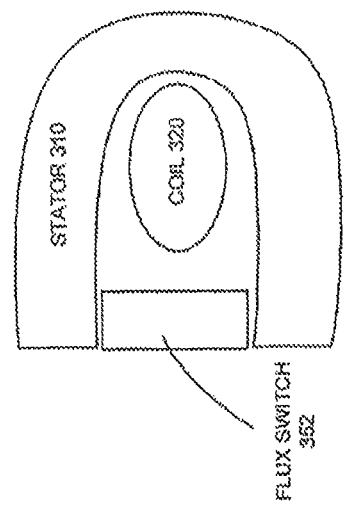
FIG. 3A is a cross-sectional view illustrating an exemplary cavity engaged configuration in accordance with an exemplary embodiment.
Figure 3B:
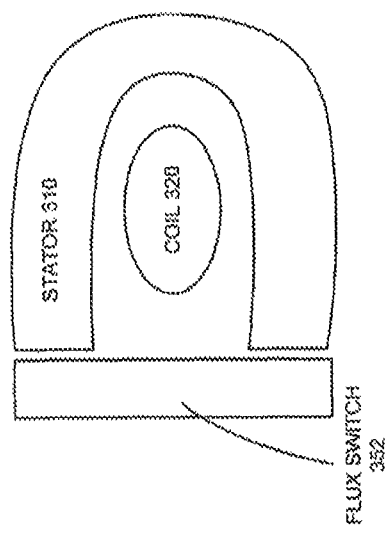
FIG. 3B is a cross-sectional view illustrating an exemplary face engaged configuration in accordance with an exemplary embodiment.
Figure 3C:
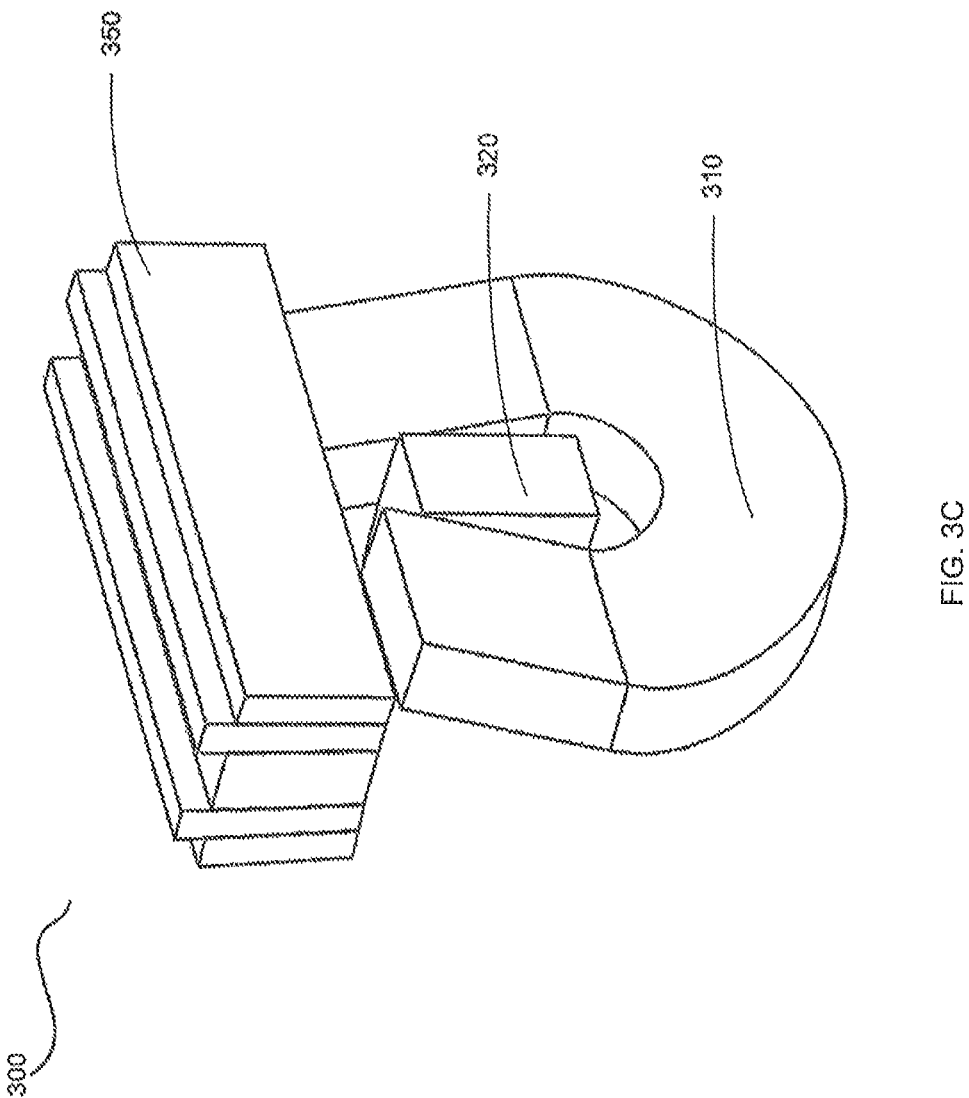
FIG. 3C is an isometric view illustrating an exemplary face engaged transverse flux configuration in accordance with an exemplary embodiment.

With reference now to FIG. 3A, a flux switch 352 in a commutated flux machine may engage a stator 310 by extending at least partially into a cavity defined by stator 310. Such a configuration is referred to herein as "cavity engaged." Turning to FIG. 3B, flux switch 352 in a commutated flux machine may engage stator 310 by closely approaching two terminal faces of stator 310. Such a configuration is referred to herein as "face engaged." Similar engagement approaches may be followed in transverse flux machines and are referred to in a similar manner. In general, it should be noted that a particular electrical machine may be face engaged or cavity engaged, and may be an axial gap or radial gap configuration. For example, in an exemplary embodiment, with reference to FIG. 3C, a transverse flux machine 300 comprises a coil 320 at least partially surrounded by stator 310. Stator 310 is face engaged with rotor 350 in an axial gap configuration.

The electrical machine described herein may be configured in any suitable configuration, including a radial gap or axial gap configuration, and be either face or cavity engaged. In addition, the electrical machine may be configured as an outer rotating electrical machine, as shown in FIG. 7E, whereby the stator is configured within an outer rotor. For example, the stator and rotor may be concentrically configured, with an air gap between the stator switching surface and the rotor switching surface, and the rotor may be oriented outside of the stator in an outer rotating configuration. The electrical machine described herein may also be configured in an inner rotating configuration, wherein the rotor is oriented within a stator. Again, the rotor and stator may be concentrically configured with the rotor within the stator; in an inner rotating configuration Moreover, a transverse flux machine and/or commutated flux machine in accordance with principles of the present disclosure may be configured with any suitable components, structures, and/or elements in order to provide desired electrical, magnetic, and/or physical properties. For example, a transverse flux machine having a continuous, thermally stable torque density in excess of 30 Newton-meters per kilogram of active magnetic material may be achieved by utilizing powdered metal teeth in connection with lamination stacks. As used herein, "continuous, thermally stable torque density" refers to a torque density maintainable by a motor, without active cooling, during continuous operation over a period of one hour or more. Moreover, in general, a continuous, thermally stable torque density may be considered to be a torque density maintainable by a motor for an extended duration of continuous operation, for example one hour or more, without significant thermal performance degradation and/or damage.

Additionally, in accordance with principles of the present disclosure, a transverse flux machine and/or commutated flux machine may be configured to achieve a higher voltage constant. In this manner, the number of turns in the machine may be reduced, in connection with a higher frequency. A corresponding reduction in coil resistance and/or the number of turns in the coil may thus be achieved. Similarly, as the voltage may be higher, the current may be smaller, resulting in a more efficient machine.

Yet further, in accordance with principles of the present disclosure, a transverse flux machine and/or commutated flux machine may be configured to achieve a high flux switching frequency, for example a flux switching frequency in excess of 500 Hz. Because flux is switched at a high frequency, torque density may be increased.

An electrical machine, for example an electric motor, may be any system configured to facilitate the switching of magnetic flux. In an exemplary embodiment, an electric motor may comprise a transverse flux machine and/or a commutated flux machine. In general, a transverse flux machine and/or commutated flux machine comprises a rotor, a stator, and a coil. A flux switch may be located on the stator or the rotor. As used herein, a "flux switch" may be any component, mechanism, or device configured to open and/or close a magnetic circuit (i.e., a portion where the permeability is significantly higher than air). A magnet may be located on the stator or the rotor. Optionally, flux concentrating portions may be included on the stator and/or the rotor.

A coil may be at least partially enclosed and/or partially surrounded by the stator or the rotor. In an exemplary embodiment, a "partially enclosed" or "partially surrounded" coil may be considered to be a coil wherein more than 50% of the coil exterior is surrounded by the stator and/or rotor In another exemplary embodiment, a "partially enclosed" or "partially surrounded" coil may be considered to be a coil wherein a magnet, a flux concentrator, and/or a flux switch surrounds the coil by greater than 180 degrees (i.e., more than halfway around the coil).

Figure 1A:
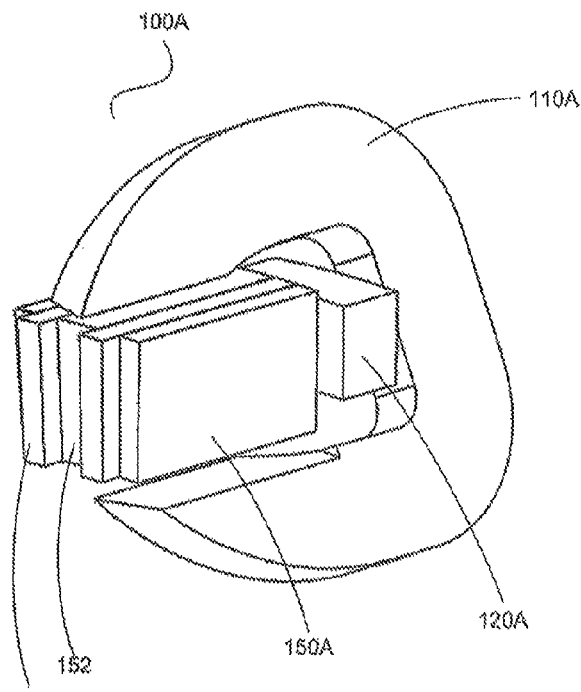
FIG. 1A is an isometric view illustrating an exemplary transverse flux machine (is this a machine or portion of a machine?) in accordance with an exemplary embodiment.

In accordance with an exemplary embodiment, and with renewed reference to FIG. 1A, an electrical machine, for example transverse flux machine (TFM) 100A, generally comprises a rotor 150A, a stator 110A, and a coil 120A. Rotor 150A comprises a plurality of interleaved magnets 154 and flux concentrators 152. Rotor 150A is configured to interact with stator 110A in order to facilitate switching of magnetic flux. Stator 110A is configured to be magnetically coupled to rotor 150A, and is configured to facilitate flow of magnetic flux via interaction with rotor 150A. Stator 110A at least partially encloses coil 120A. Coil 120A is configured to generate a current output responsive to flux switching and/or accept a current input configured to drive rotor 150A. Transverse flux machine 100A may also comprise various structural components, for example components configured to facilitate operation of transverse flux machine 100A. Moreover, transverse flux machine 100A may comprise any suitable components configured to support, guide, modify, and/or otherwise manage and/or control operation of transverse flux machine 100A and/or components thereof.

Figure 1B:
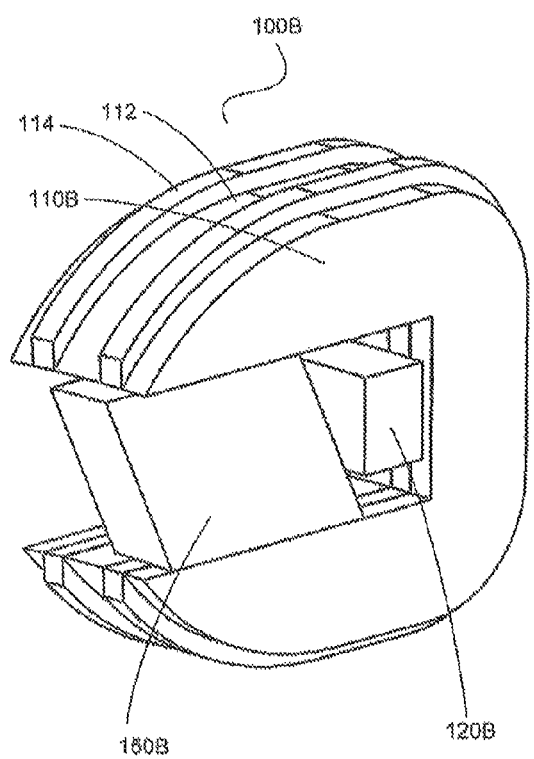
FIG. 1B is an isometric view illustrating an exemplary commutated flux machine in accordance with an exemplary embodiment.

In accordance with an exemplary embodiment, and with reference to FIG. 1B, an electrical machine, for example commutated flux machine (CFM) 100B, generally comprises a stator 110B, a rotor 150B, and a coil 120B. Stator 110B comprises a plurality of interleaved magnets 114 and flux concentrators 112. Stator HOB at least partially encloses coil 12013. Stator 11013 is configured to interact with rotor 150B in order to facilitate switching of magnetic flux. Stator 110B is configured to be magnetically coupled to rotor 150B, and is configured to facilitate flow of magnetic flux via interaction with rotor 150B. Coil 120B is configured to generate a current output responsive to flux switching and/or accept a current input configured to drive rotor 150B. Commutated flux machine 100B may also comprise various structural components, for example components configured to facilitate operation of commutated flux machine 100B. Moreover, commutated flux machine 100B may comprise any suitable components configured to support, guide, modify, and/or otherwise manage and/or control operation of commutated flux machine 100B and/or components thereof.

Turning now to FIGS. 4A-4C, in accordance with various exemplary embodiments a transverse flux machine and/or commutated flux machine may utilize one or more side laminations 412. Side lamination 412 may be configured with one or more "trenches" 411 on an edge thereof.

In various exemplary embodiments, trenches 411 may be configured to at least partially correspond to and/or align with the dimensions of a stator tooth. Moreover, trenches 411 may be configured to taper and/or otherwise vary in width along a radial direction. In this manner, trenches 411 can be configured to provide a degree of mechanical retention to an object inserted into trench 411, for example a stator tooth.

In various exemplary embodiments, side lamination 412 is configured with at least partially interlocking portions. A side lamination may comprise a radial edge 450 that is non-linear, whereby when configured with another side lamination creates an interlocking interface 415. In another example, a sheet of planar material may be stamped to form one or more interlocking features 455, such as protrusions, or prongs 460, cutouts or recesses 465, or other shapes on an edge of side lamination 412. When two side laminations 412 are brought near one another, the prongs may at least partially interlock and/or interface along a somewhat "zig-zag," or "lightning-bolt" shaped gap therebetween. In general, side laminations 412 may at least partially interlock with one another via one or more lamination interlocking features 455 including, but not limited to, shapes, flanges, extensions, cutouts, "puzzle piece" portions, non-linear radial edge portions and/or the like disposed along a at least one radial edge of side lamination 412. Moreover, with specific momentary reference to FIG. 4C, in various exemplary embodiments multiple side laminations 412 may be utilized to form a generally ring-shaped structure, for example for use in a stator of a transverse flux machine.

Additionally, side lamination 412 may be configured with one or more nubs 413 disposed on a stator interfacing edge 470 of side lamination 412 between trenches 411. Nubs 413 may at least partially define a cavity 413A therebetween. Nubs 413 may be rounded, acute, parabolic, angled, square, triangular, rectangular, and/or otherwise shaped and/or sized to at least partially define one or more dimensions of cavity 413A. However, cavity 413A may be configured with any suitable dimensions, as desired. In various exemplary embodiments, cavity 413A at least partially "narrows" and "widens" along a radial direction. Stated another way, cavity 413A may be configured with an inner "bulge" or "head" joining a thinner "neck". When an adhesive, such as an epoxy or other material is deposited into cavity 413A and then solidified, the thicker "head" area is mechanically retained by the narrowing sidewalls of cavity 413A. In this manner, cavity 413A and nubs 413 can cooperate to provide mechanical retention to material in cavity 413A. A nub or nubs extend into a cavity in the radial direction to reduce the radial dimension of the cavity. In an exemplary embodiment, a pair of nubs are substantially radially aligned with each across a cavity to narrow the cavity therebetween.

Figure 4D:
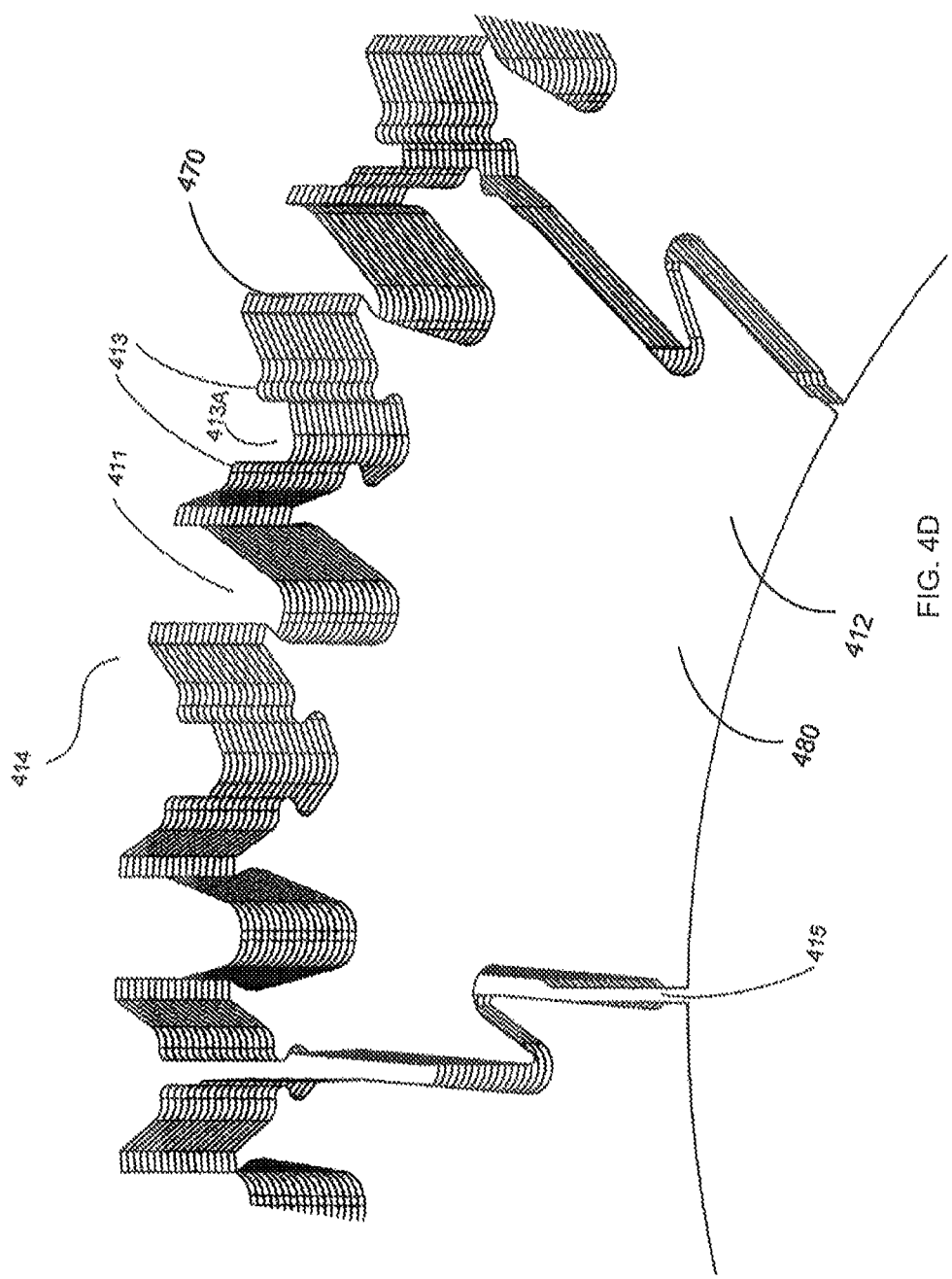
FIG. 4D is an isometric view illustrating a lamination stack in accordance with an exemplary embodiment.

With reference now to FIG. 4D, and with momentary reference to FIG. 6D, in an exemplary embodiment a lamination stack 414 may be formed from one or more side laminations 412. In an exemplary embodiment, all side laminations 412 in a lamination stack 414 are geometrically identical having exactly the same shape within suitable tolerance variations. In another exemplary embodiment, one or more side laminations 412, for example one or more adjacent side laminations 412 beginning on an axial edge surface 480 of lamination stack 414, may be configured with different dimensions than other side laminations in lamination stack 414. For example, a particular lamination stack 414 may comprise one or more side laminations 412 lacking a particular trench 411. Moreover, a particular lamination stack 414 may comprise one or more side laminations having at least one trench 411 differing in dimensions from a corresponding trench 411 on an adjacent side lamination 412. In this manner, retention of an object in lamination stack 414 may be facilitated.

Additional details regarding side laminations, lamination stacks, segmented lamination stacks, materials for laminations and the like may be found in U.S. Provisional Patent Application Ser. No. 61/414,769 filed Nov. 17, 2010 and entitled "TRANSVERSE AND/OR COMMUTATED FLUX SYSTEMS HAVING SEGMENTED STATOR LAMINATIONS" having common ownership as the present application, the contents of which are hereby incorporated by reference in their entirety.

Turning now to FIGS. 5A-5C, in accordance with various exemplary embodiments a transverse flux machine and/or commutated flux machine may utilize one or more portions formed from powdered metal or other soft magnetic composite materials, for example tooth 516. Tooth 516 may be formed from powdered metal, metallic glasses, nanocrystalline composites, and/or combinations of the same, or other suitable material or combination of materials having desirable magnetic and structural properties.

In an exemplary embodiment, tooth 516 has a width of about 3.6 mm, a height of about 5.4 mm, and a length of about 11 mm. A tooth 516 may be configured with any suitable width including, but not limited to, greater than about 2 mm, greater than about 4 mm, greater than about 6 mm, greater than about 10 mm, greater than about 15 mm and any range between and including the widths provided. A tooth 516, may be configured with any suitable height including, but not limited to, greater than about 2 mm, greater than about 4 mm, greater than about 6 min, greater than about 10 mm, greater than about 15 mm, and any range between and including the heights provided. A tooth 516 may be configured with any suitable length including, but not limited to, greater than about 4 mm, greater than about 8 mm, greater than about 12 mm, greater than about 20 mm, greater than about 28 mm, greater than about 35 mm, and any range between and including the lengths provided. Moreover, tooth 516 may be configured with any suitable dimensions, geometries, and/or materials in order to facilitate switching of magnetic flux in a transverse flux machine and/or commutated flux machine. In particular, a tooth may be configured geometrically to nest with and be retained by a trench in a lamination stack. In an exemplary embodiment, the width of the tooth increases from the flux switching surface down.

In an exemplary embodiment, tooth 516 has a volume of about 170 cubic millimeters. In various exemplary embodiments, tooth 516 has a volume of between about 50 cubic millimeters and about 2 cubic centimeters. A tooth 516 may be configured with any suitable volume including, but not limited to, greater than about 50 cubic millimeters, greater than about 100 cubic millimeters, greater than about 250 cubic millimeter, greater than about 500 cubic millimeter, greater than about 1 cubic centimeter, greater than about 2 cubic centimeter, and any range between and including the volumes provided. In an exemplary embodiment, tooth 516 has a mass of about 1.2 grams. In various exemplary embodiments, tooth 516 has a mass of between about 0.3 grams to about 15 grams. A tooth 516 may have any suitable mass including, but not limited to, greater than about 0.3 grams, greater than about 1 gram, greater than about 5 grams, greater than about 10 grams, greater than about 15 grams, and any range between and including the mass provided. In an exemplary embodiment, tooth 516 has a density of about 7.5 grains per cubic centimeter. In various exemplary embodiments, tooth 516 has a density of between about 5 grams per cubic centimeter to about 7.8 grams per cubic centimeter. A tooth 516 may have any suitable density including, but not limited to, greater than about 5 grams per cubic centimeter, greater than about 7 grains per cubic centimeter, greater than about 7.8 grams per cubic centimeter, and any range between and including the density values provided. Moreover, tooth 516 may be configured with any suitable volume, density, and/or mass in order to facilitate switching of magnetic flux in a transverse flux machine and/or commutated flux machine.

In various exemplary embodiments, tooth 516 is configured with a switching surface 516S intended to face an air gap in a transverse flux machine and/or a commutated flux machine. Switching surface 516S may be planar or comprise a plurality of planar surface portions; alternatively, switching surface 516S may be convex and/or concave. Switching surface 516S may be configured with various lengths, widths, curves, and/or the like, as suitable. For example, in an exemplary embodiment the length and width of switching surface 516S may be selected based on dimensions of a portion of a rotor to which tooth 516 is intended to interface. For example, switching surface 516S may be configured to have a width about the same width as a flux concentrator in a rotor of a transverse flux machine. Moreover, switching surface 516S may be configured to have a width wider than the width of a flux concentrator in a rotor of a transverse flux machine.

In various exemplary embodiments, switching surface 516S may be configured for switching a sufficient amount of magnetic flux in order to saturate or nearly saturate other components of a magnetic flux path in a transverse flux machine and/or commutated flux machine. Moreover, switching surface 516S and/or other portions of tooth 516 may be configured to reduce flux leakage in a transverse flux machine and/or commutated flux machine.

In various exemplary embodiments, tooth 516 is configured to taper in one or more dimensions. For example, tooth 516 may taper in a length direction, for example as illustrated in FIG. 5A. Additionally, tooth 516 may taper in a height direction, for example as illustrated in FIGS. 5B and 5C. Moreover, in certain exemplary embodiments tooth 516 may vary in width along the height direction such that the width of tooth 516 at switching surface 516S is not the maximum width of tooth 516. Stated another way, tooth 516 may be "fatter", or wider in the middle. In this manner, tooth 516 may interface with overhanging portions of a lamination stack 414, for example in order to facilitate mechanical coupling to and/or retention of tooth 516 in a lamination stack 414. Additionally, tooth 516 may be configured with various cutouts, trenches, extrusions, "roots", depressions, ridges, steps, notches, and/or other geometric features configured to allow tooth 516 to at least partially align with corresponding portions of a lamination stack 414. As shown in FIG. 5B, tooth 516 has a non-linear radial edge surface 516R. In an exemplary embodiment, a tooth radial edge surface is at least partially covered by a lamination stack that extends to the switching surface 516S. In a preferred embodiment, the radial edge surface on both sides of a tooth is covered a lamination stack, as shown in FIG. 6A.

In various exemplary embodiments, tooth 516 may be configured with one or more "roots", or protrusions 570 extending away from the main body of tooth 516 in a radial direction into lamination stack 414. In this manner, tooth 516 may be configured with a larger surface area for transferring magnetic flux between tooth 516 and lamination stack 414.

In an exemplary embodiment, the shape of tooth 516 may be shaped to maximize the engagement and transfer of flux over a mating surface of tooth 516, for example over switching surface 516S (where flux may be received from and/or transferred to a rotor), and/or over the sides and bottom of tooth 516 (where flux may be received from and/or transferred to lamination stack 414).

Moreover, the shape of tooth 516 may be shaped to maximize the engagement of flux over a mating surface of tooth 516 while generating a flow of flux around a coil in a desired direction. In various exemplary embodiments the shape of tooth 516 may be configured to reduce hysteresis losses in a rotor, for example by extending a desired axial distance along a flux concentrator in a rotor. Additionally, in various exemplary embodiments, the shape of tooth 516 may contribute to reduced eddy current losses in a coil, for example by at least partially shielding a coil from flux switching across an air gap in a transverse flux machine and/or commutated flux machine In an exemplary embodiment, the shape of tooth 516 may be selected to produce an electrical machine with a high torque density, for example by acting as a flux concentrator for flux transferred through lamination stack 414. Additionally, the shape of tooth 516 may be selected to produce an electrical machine with a smaller physical footprint, such as a reduced length along the axis of rotation of a transverse flux machine, by shortening the length of tooth 516. Yet further, the shape of tooth 516 may be tapered, for example in order to reduce flux leakage between adjacent and/or interleaved teeth 516 in a transverse flux machine.

Figure 6B:
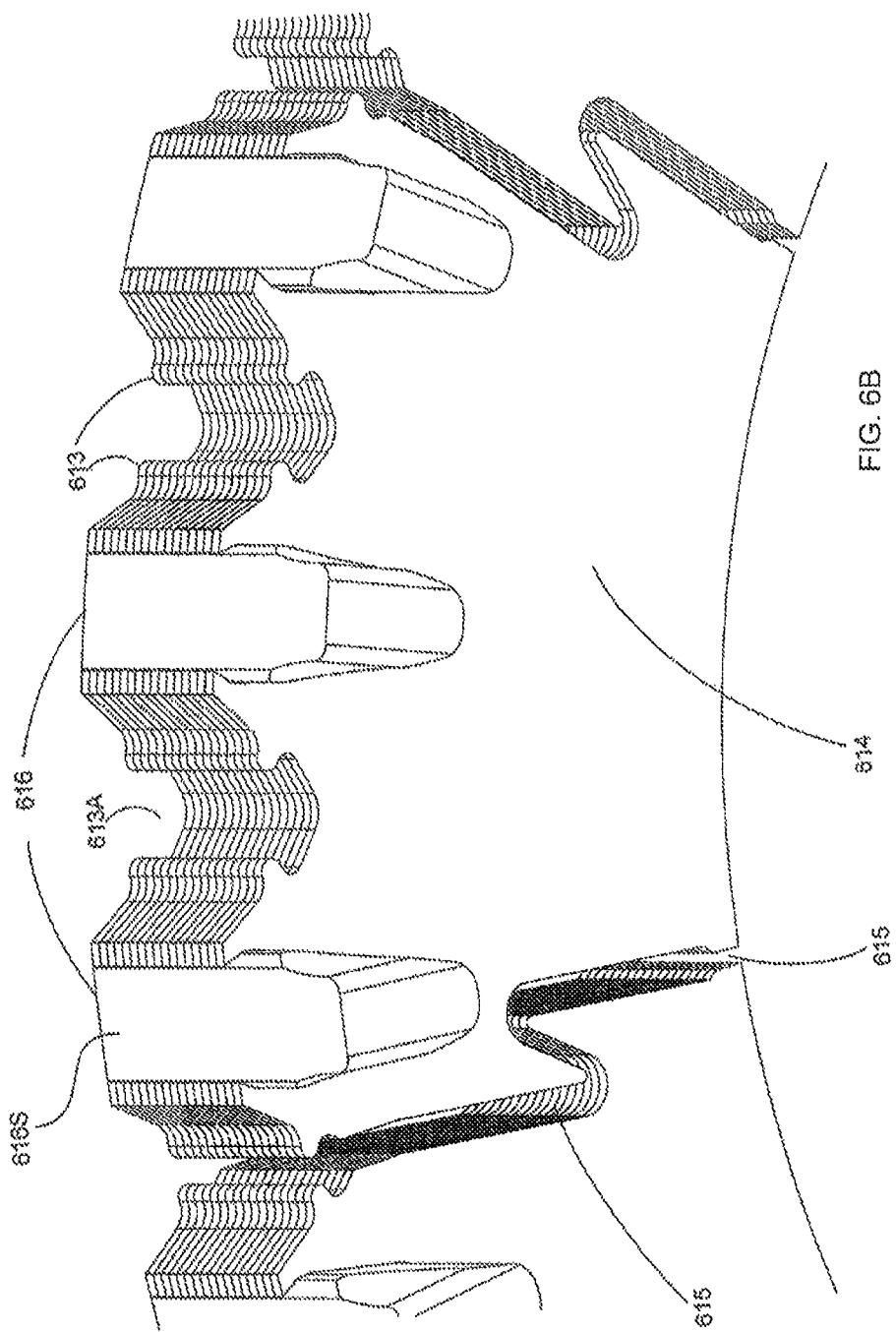
Figure 6E:
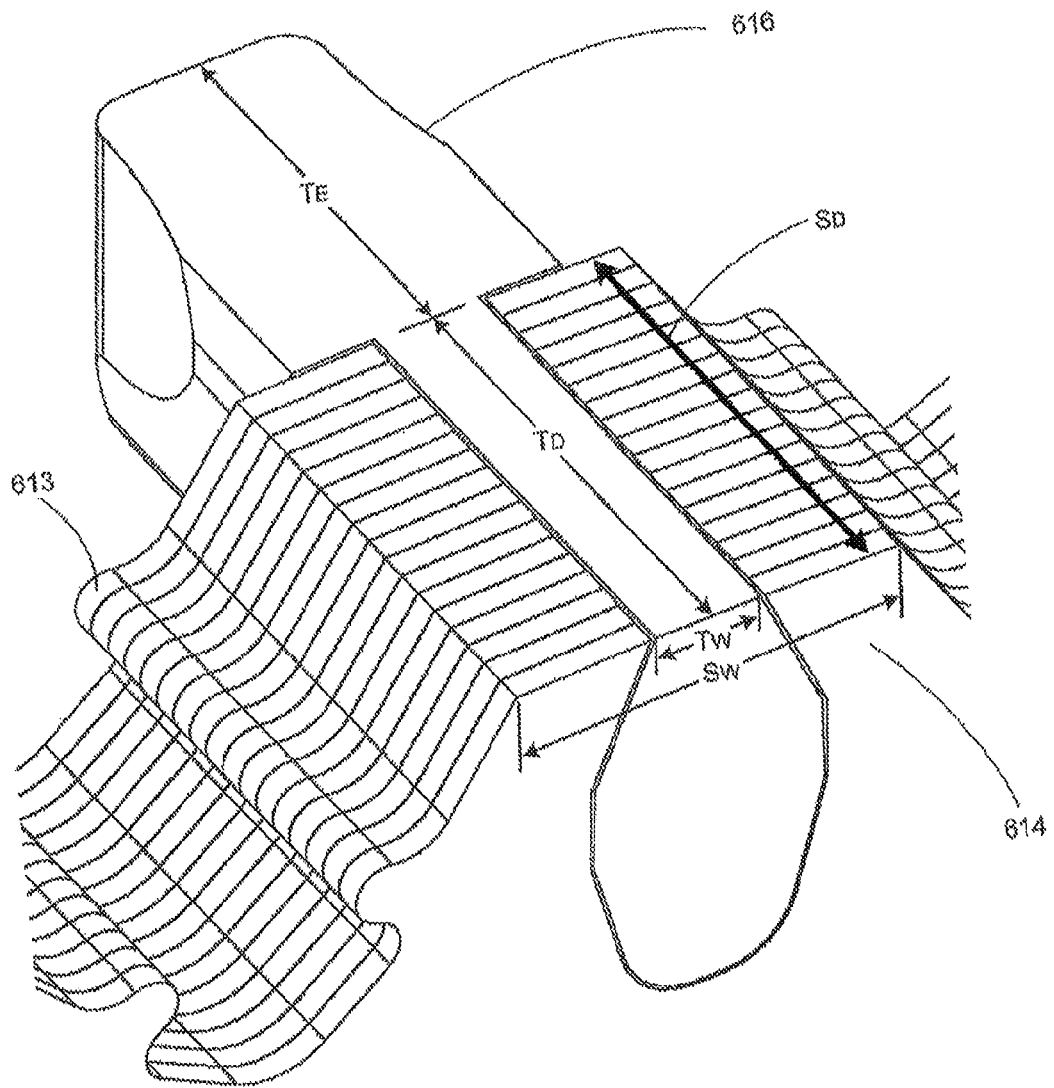
FIG. 6E is an isometric view illustrating configuration of a lamination stack and stator teeth coupled thereto in accordance with an exemplary embodiment.
Figure 6F:
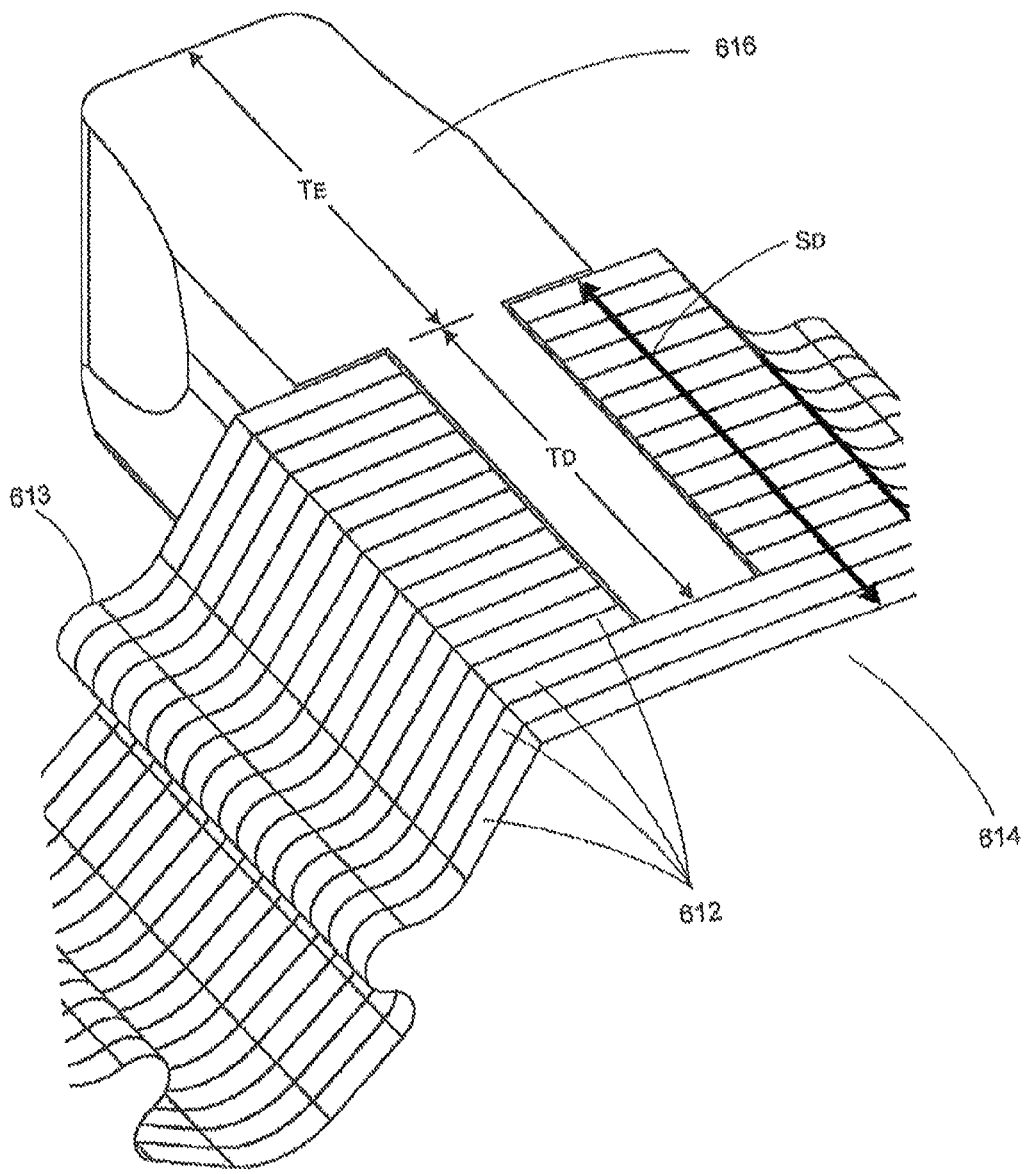
FIG. 6F is an isometric view illustrating a stator tooth extending partway through a lamination stack in accordance with an exemplary embodiment.

Turning now to FIGS. 6A-6D, in accordance with various exemplary embodiments a tooth 616 may be placed in a trench in a lamination stack 614. In an exemplary embodiment, one end of tooth 616 may be set generally flush with one side of lamination stack 614, and another end of tooth 616 (e.g., a generally tapered end) may extend beyond the other side of lamination stack 614 (as illustrated in FIGS. 6A and 6B).

In another exemplary embodiment, with reference now to FIG. 6D, one end of tooth 616 may be inserted at least partially through lamination stack 614, and another end of tooth 616 (e.g., a generally tapered end) may extend beyond the other side of lamination stack 614. Tooth 616 may extend only partway through lamination stack 614 due to one or more side laminations 612 configured without a trench. Moreover, tooth 616 may be coupled to lamination stack 614 and/or aligned with respect to lamination stack 614 in any suitable manner and/or configuration.

Returning to FIG. 6C, in various exemplary embodiments a coupled tooth 616 and lamination stack 614 may be configured with a switch area $S_A$. Switch area $S_A$ is generally defined by the area of switching surface 616S plus the area of at least one switch edges $S_E$ disposed on either side of tooth 616. In an exemplary embodiment, the switching edges SE are disposed on both sides of a tooth 616, as shown in FIG. 6C. Switch edges $S_E$ arise from portions of lamination stack 614 at least partially overhanging tooth 616. The switch area may also be comprised of a lamination switch surface $S_R$, as shown in FIG. 6D, where a portion of a lamination stack extends to the switching surface. A portion of the tooth may be disposed under the lamination switch surface $S_R$. In various exemplary embodiments, switch edges $S_E$ and/or a lamination switch surface $S_R$ flush with switching surface 516S. Stated another way, switching surface 616S and switch edges $S_E$ and/or a lamination switch surface $S_R$ may be configured to create a constant air gap width across switch area $S_A$, wherein the distance between the stator switch surface and rotor switch surface is substantially constant, having no more than 15% variation. Switch edges $S_E$ may be of similar size on either side of tooth 616; alternatively, switch edges $S_E$ may vary in dimensions from one another. Moreover, in certain exemplary embodiments a switch edge $S_E$ is present on one side of tooth 616 but not on the other side, for example due to a trench 611 having a vertical sidewall on one side and an at least partially arched or non-linear sidewall on an opposing side.

Continuing to reference FIG. 6C, in various exemplary embodiments switch area $S_A$ is configured with an overall switch width $S_W$ in a rotational direction of a rotor. A switch width $S_W$ may be configured to be any suitable width greater than the width of a flux concentrator including, but not limited to, greater than about 1.2 times the width of a flux concentrator in a rotor, greater than about 1.5 times the width of a flux concentrator in a rotor, greater than about 1.875 times the width of a flux concentrator in a rotor, greater than about 2 times the width of a flux concentrator in a rotor, and any range between an including the width ratios provided. Moreover, a desirable ratio of switch width $S_W$ to the width of a flux concentrator in a rotor may vary, for example based on dimensions of an air gap in a transverse flux machine.

In various exemplary embodiments, tooth 616 is configured with a tooth width $T_W$ across switching surface 616S in a rotational direction of a rotor. In general, tooth width $T_W$ may be smaller than switch width $S_W$. For example, tooth width $T_W$ may be any suitable percentage of the $S_W$ width, including greater than about 5% of switch width $S_W$, greater than about 15% of switch width $S_W$, greater than about 50% of the switch width $S_W$, greater than about 70% of the switch width $S_W$, greater than about 95% of the switch width, and any range between an including the widths provided. In an exemplary embodiment, tooth width $T_W$ is about 70% of switch width $S_W$. Described differently, in this exemplary embodiment each switch edge $S_E$ has a width of about 15% of switch width $S_W$ in a rotational direction of a rotor. In another exemplary embodiment, tooth width $T_W$ is about 62% of switch width $S_W$.

Continuing to reference FIG. 6C, in various exemplary embodiments tooth 616 extends into lamination stack 614 an insertion distance $T_D$. Moreover, in various exemplary embodiments tooth 616 extends beyond an axial edge surface 480 of lamination stack 614 an extension distance $T_E$. Extension distance $T_E$ may be greater than the insertion distance $T_D$, about equal to and/or equal to extension distance $T_E$, and/or less than insertion distance $T_D$. A tooth may be configured with any suitable insertion distance $T_D$ and/or extension distance $T_E$, including, but not limited to, greater than about 3 mm, greater than about 5 mm, greater than about 10 mm, greater than about 15 mm, greater than about 20 mm, and any range between and including the distances provided.

With reference to FIGS. 6C through 6F, in an exemplary embodiment, distance $T_D$ is about equal to switch depth $S_D$. Stated another way, in this exemplary embodiment tooth 616 extends fully into lamination stack 614. Moreover, in another exemplary embodiment, distance $T_D$ is about 60 percent of switch depth $S_D$. Stated another way, in this exemplary embodiment tooth 616 extends about 60% of the way into lamination stack 614. In various exemplary embodiments, distance $T_D$ may range from between about equal to switch depth $S_D$ to about 40% of switch depth $S_D$. Stated generally, in various exemplary embodiments tooth 616 may extend from about 40% of the way into lamination stack 614 to about 100% into lamination stack 614. In general, tooth 616 may be inserted a desired distance into lamination stack 614 in order to vary one or more performance characteristics of a transverse flux machine. For example, tooth 616 may be inserted a desired distance in order to provide a suitable degree of mechanical support to tooth 616; to provide a sufficient surface area for flux transfer between tooth 616 and lamination stack 614, and/or the like.

With reference now to FIGS. 6C and 6D, in various exemplary embodiments distance $T_D$ may be about equal to switch depth $S_D$, for example as illustrated in FIG. 6C. In other exemplary embodiments, distance $T_D$ may be less than switch depth $S_D$, for example as illustrated in FIG. 6D. Distance $T_D$ may be less than switch depth $S_D$ due to tooth 616 being inserted only partway into lamination stack 614; moreover, distance $T_D$ may be less than switch depth $S_D$ due to trench 611 extending only partway through lamination stack 614. When distance $T_D$ is less than switch depth $S_D$, an increased amount of lamination stack 614 may face an air gap in a motor, increasing the amount of flux switched across switch area $S_A$.

In various exemplary embodiments, switch area $S_A$ may be configured to have a desired configuration, for example a desired switch width $S_W$, at least in part as a function of a pole pitch in a transverse flux machine and/or commutated flux machine. In an exemplary embodiment, switch width $S_W$ is about 5 min, the pole pitch is about 5.7 mm, and the transverse flux machine is configured with 60 poles. In this embodiment, the ratio of switch width $S_W$ to pole pitch is about 0.88. In another exemplary embodiment, switch width $S_W$ is about 3 mm, the pole pitch is about 4.75 mm, and the transverse flux machine is configured with 72 poles. In this embodiment, the ratio of switch width $S_W$ to pole pitch is about 0.63. In various exemplary embodiments, the ratio of switch width $S_W$ to pole pitch may be between about 0.2 to about 0.8. Moreover, the ratio of switch width Sw to pole pitch may be selected based on one or more of a desired cogging torque in the transverse flux machine, the diameter of a rotor in the transverse flux machine, the number of poles in the transverse flux machine, the dimensions of an air gap in the transverse flux machine, and/or the like, as suitable, in order to achieve one or more desired operational and/or performance characteristics of the transverse flux machine. Moreover, stated generally, switch area $S_A$ may be configured to maximize the amount of flux switched between a rotor and a stator in a transverse flux machine and/or commutated flux machine.

With reference now to FIG. 66, in various exemplary embodiments multiple lamination stacks 614 may be utilized to form a generally ring-shaped structure, or lamination ring 650. Teeth 616 are placed in trenches in the lamination stacks 614, resulting in a generally ring-shaped structure having multiple areas for switching of magnet flux disposed along the circumference thereof. As used herein, a generally ring-shaped structure or other suitable structures composed of lamination stacks 614 and/or teeth 616 may be referred to as a "stator half" 655 shown in FIG. 6G. A stator half 655, comprising lamination stacks 614, may be separated by interlocking interfaces 615. These interfaces may comprise a lamination stack having a non-linear radial edges that is configured to interface with an adjoining lamination stack. Moreover, the interfacing gap 660 between the interlocking interfaces 615 may be variable along the length of interlocking interfaces 615. The interfacing gap 660 may be configured with any suitable width Gw including, but not limited to, greater than about 1 mm (0.04 inches), greater than about 1.5 mm (0.06 inches), greater than about 2 mm (0.08 inches), greater than about 2.5 mm (0.10 inches) and any range between and including the widths provided. The interfacing gap width Gw is measured between to interfacing lamination stacks in a radial direction. An interfacing gap 660 may be any shape, size, and/or width, as desired. In an exemplary embodiment, the stator half cuts 615 are configured to reduce losses in a transverse flux machine.

In various exemplary embodiments, one or more lamination stacks 614 in a stator half may be configured with one or more holes 619 at least partially therethrough, as shown in FIG. 6G. Holes 619 may be configured to facilitate mounting of additional motor components to a stator half, for example an adjustable Hall effect sensor system, a temperature sensor, and/or the like.

Figure 7A:
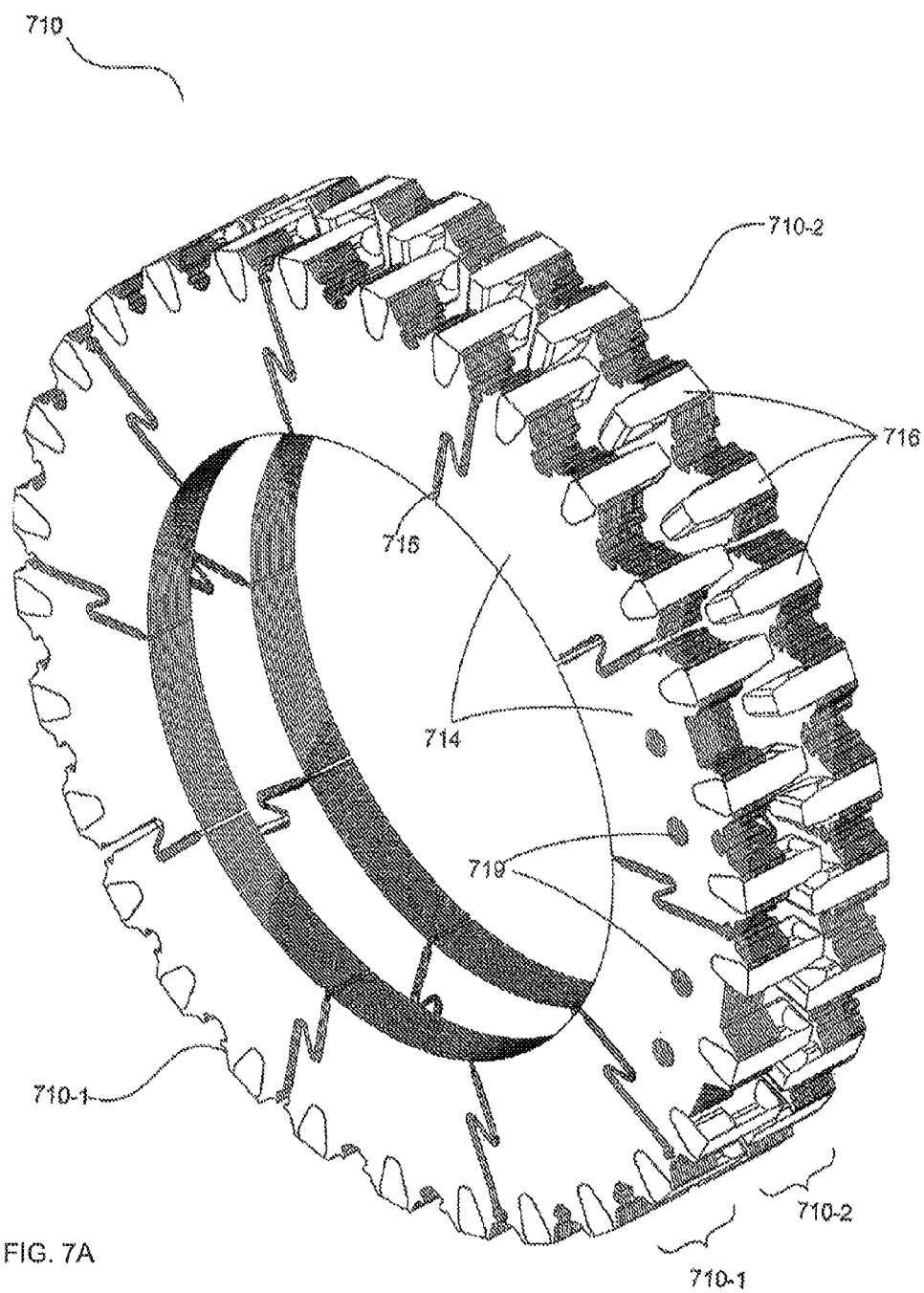
FIG. 7A is an isometric view illustrating two ring-shaped stator halves for a transverse flux machine in accordance with an exemplary embodiment.
Figure 7B:
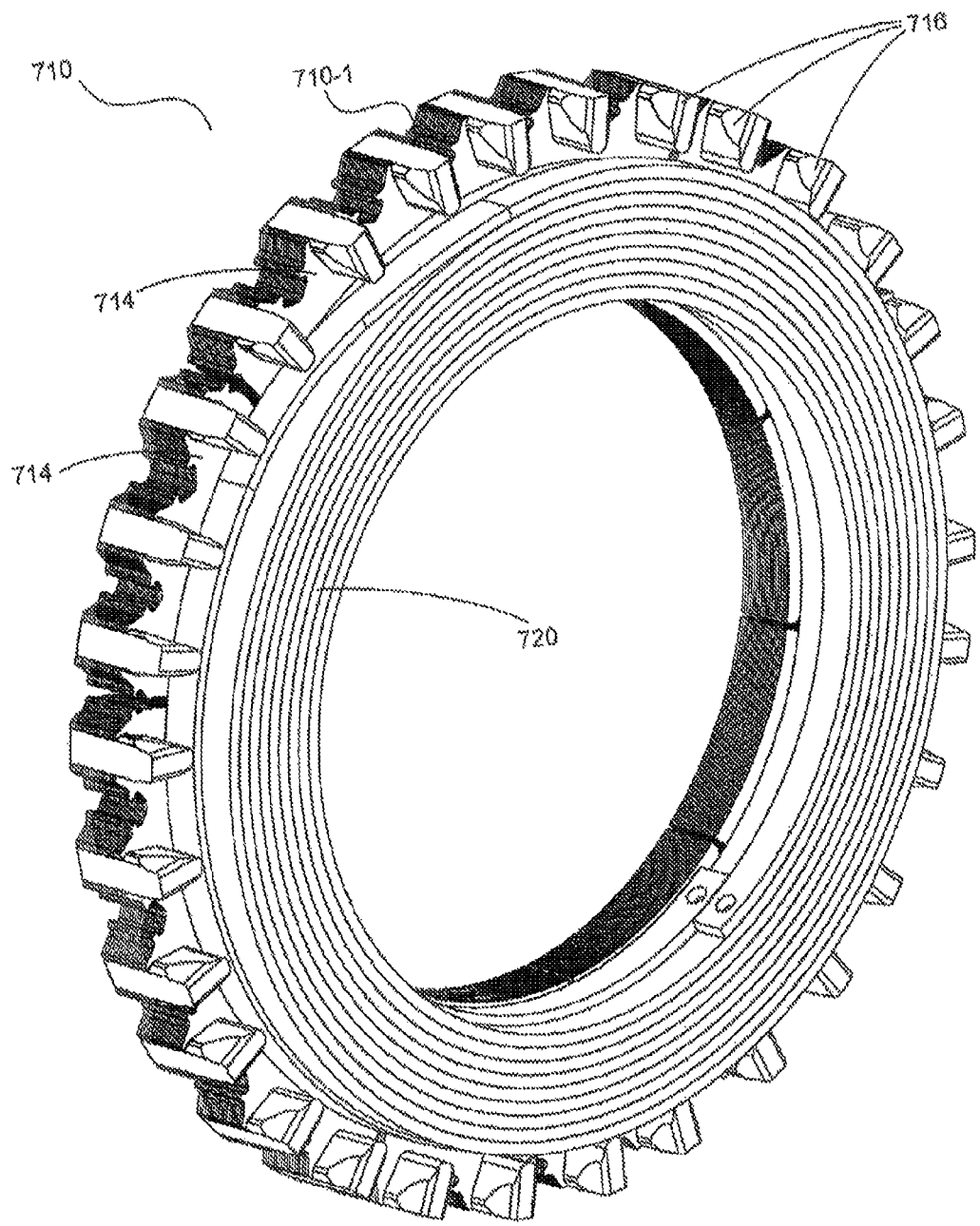
FIG. 7B is an isometric view illustrating a stator half and a dual-wound coil in accordance with an exemplary embodiment.
Figure 7C:
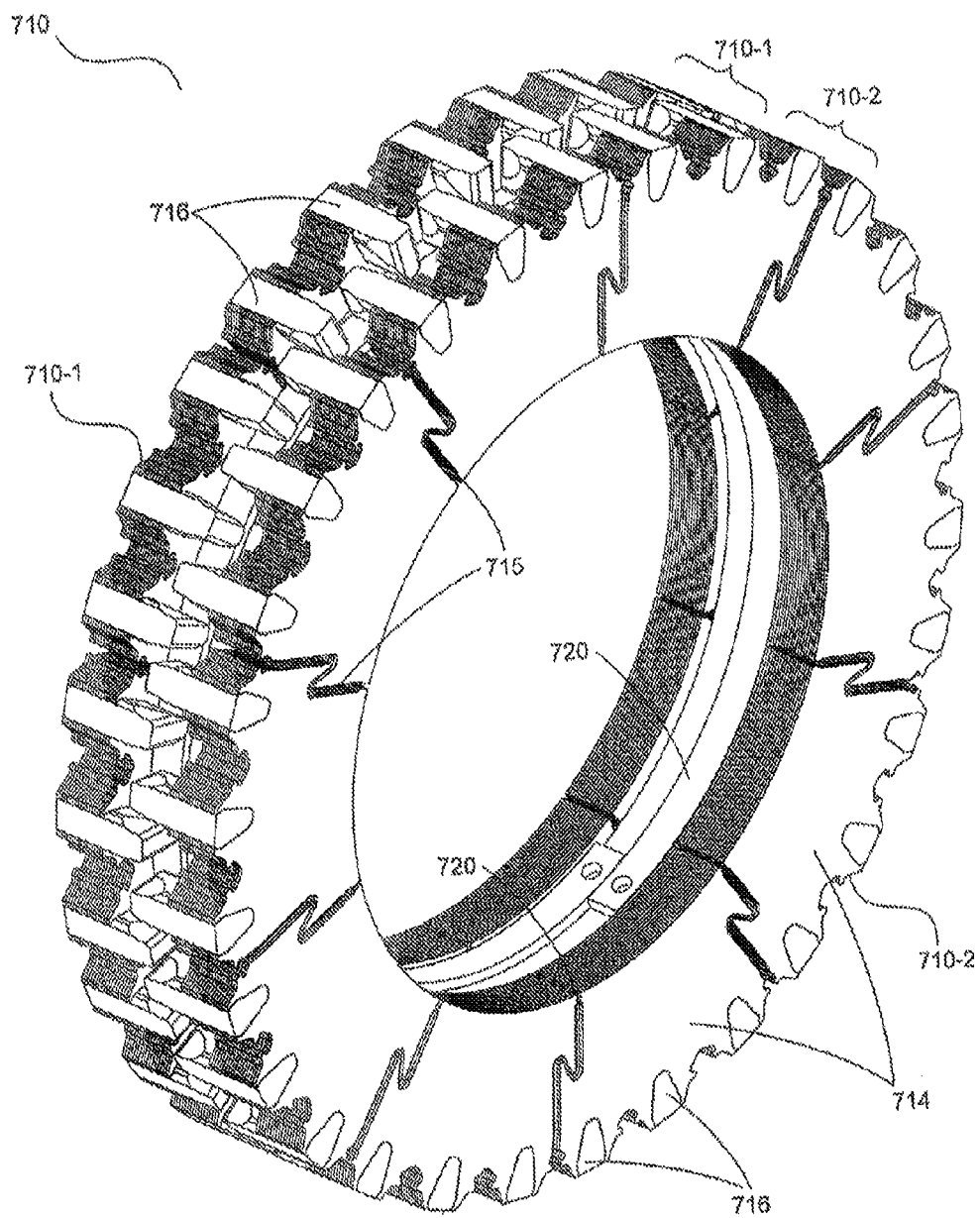
FIG. 7C is an isometric view illustrating a stator assembly comprising two stator halves at least partially surrounding a dual-wound coil in accordance with an exemplary embodiment.

In various exemplary embodiments, turning now to FIGS. 7A-7C, a first stator half 710-1 and a second stator half 710-2 may be utilized to form at least a portion of a stator assembly 710 for a transverse flux machine. Stator half 710-1 and 710-2 are placed with a coil 720 therebetween. Coil 720 may be conventionally wound; moreover, coil 720 may be a dual wound coil. Stator half 710-1 and 710-2 face one another, with tapered portions of teeth 716 extending into the gap therebetween. Stator half 710-1 and 710-2 are rotationally aligned to a desired position with respect to one another. For example, stator half 710-1 and 710-2 are rotationally aligned in order to provide a desired timing for flux switching in stator assembly 710. Additionally, stator half 710-1 and 710-2 may be rotationally aligned in order to provide a desired spacing between teeth 716 of stator half 710-1 and teeth 716 of stator half 710-2 in order to reduce flux leakage therebetween, to implement a sixth-phase offset, and/or the like.

With additional reference now to FIG. 7D, in various exemplary embodiments stator assembly 710 is configured as a polyphase stator assembly having phases 710A, 710B, and 710C. Each stator phase comprises a first stator half (for example, stator half 710-1) and a second stator half (for example, stator half 710-2) with a coil therebetween (for example, coil 720). Flux paths between a first stator half and a second stator half may be provided by one or more back return laminations 718. Additional details regarding back return laminations are disclosed in U.S. Provisional Patent Application Ser. No. 61/414,769 filed on Nov. 17, 2010 and entitled "TRANSVERSE AND/OR COMMUTATED FLUX SYSTEMS HAVING SEGMENTED STATOR LAMINATIONS" having common ownership as the present application, the contents of which are hereby incorporated by reference in their entirety. Moreover, flux paths within polyphase stator assembly 710 may be provided via any suitable components, structures, and/or materials in order to facilitate switching of magnetic flux around one or more coils.

In an exemplary embodiment, with reference now to FIGS. 7D and 7E, an exemplary polyphase transverse flux machine 700 comprises polyphase stator assembly 710 and rotor 750. Rotor 750 comprises at least one flux concentrator 752 and at least one magnet 754, each of which may comprise any suitable shape. In an exemplary embodiment, both flux concentrator 752 and magnet 754 are substantially rectangular in three dimensions. In other exemplary embodiments, flux concentrator 752 and/or magnet 754 are tapered, rounded, and/or otherwise at least partially non-rectangular. In various exemplary embodiments, flux concentrator 752 comprises layers of laminated material. In an exemplary embodiment, flux concentrator 752 comprises layers of non-oriented silicon steel. In other exemplary embodiments, flux concentrator 752 comprises powder metal, or one or more layers of silicon steel, nickel alloys, cobalt alloys, and/or the like. Moreover, flux concentrator 752 may comprise alternating and/or interleaved layers of multiple materials.

In various exemplary embodiments, rotor 750 comprises a generally ring-shaped structure comprised of alternating magnets 754 and flux concentrators 752. In rotor 750, magnets 754 may be configured to be "extended" with respect to flux concentrators 752. Moreover, rotor 750 may be configured to be at least partially overhung with respect to polyphase stator assembly 710. Additional details regarding extended magnets and/or overhung rotors are disclosed in U.S. patent application Ser. No. 12/772,958 filed on May 3, 2010, entitled "TRANSVERSE AND/OR COMMUTATED FLUX SYSTEMS CONFIGURED TO PROVIDE REDUCED FLUX LEAKAGE, HYSTERESIS LOSS REDUCTION, AND PHASE MATCHING" having common ownership as the present application, the contents of which are hereby incorporated by reference in their entirety.

When transverse flux machine 700 is operated as a motor, responsive to a polyphase input current (for example, an AC input current differing in phase in each of dual wound coils 720A, 720B, and 720C, rotor 750 is driven to rotate with respect to polyphase stator assembly 710. When transverse flux machine 700 is operated as a generator, responsive to a mechanical force causing rotor 750 to rotate, an AC output current is induced in each of dual wound coils 720A, 720B, and 720C.

In various exemplary embodiments, transverse flux machine 700 is configured with a voltage constant $K_E$ (also referred to as back EMF constant) of between about 0.004 to about 0.006 in each phase in polyphase stator assembly 710, when $K_E$ is calculated as (volts phase-to-phase)/(RPMs*Number of turns N in a dual wound coil 720). In an exemplary embodiment, transverse flux machine 700 having a diameter of about 165 mm is configured with a voltage constant $K_E$ of about 0.0028. In certain exemplary embodiments, transverse flux machine 700 having a particular diameter is configured with a voltage constant $K_E$ of between about 0.002 to about 0.1. In contrast, various prior art electric motors having the same diameter, for example electric motors configured for use as bicycle motors, are configured with a voltage constant $K_E$ of about 0.0004 to about 0.0008. Because transverse flux machine 700 is configured with a higher voltage constant $K_E$ compared to various prior motors, transverse flux machine 700 can offer improved performance. Moreover, voltage constants in electrical machines may vary based at least in part on the diameter and/or width of an electrical machine. As such, the examples provided above are illustrative and not exhaustive.

In various exemplary embodiments, transverse flux machine 700 is configured with between about 12 turns and about 24 turns in each of dual wound coils 720A, 720B, and 720C. In these exemplary embodiments, transverse flux machine 700 may be configured to achieve an output torque of about 10 Newton-meters at a current level of about 100 amp-turns in each of dual wound coils 720A, 720B, and 720C. Yet further, in these exemplary embodiments, transverse flux machine 700 may be configured to achieve an output torque of about 88 Newton-meters at a current level of about 1000 amp-turns in each of dual wound coils 720A, 720B, and 720C. Moreover, in various exemplary embodiments, transverse flux machine 700 is configured to achieve an output torque of between about 5 Newton-meters to about 60 Newton-meters at a current level of between about 50 amp-turns to about 500 amp-turns in each of dual wound coils 720A, 720B, and 720C.

Figure 8A:
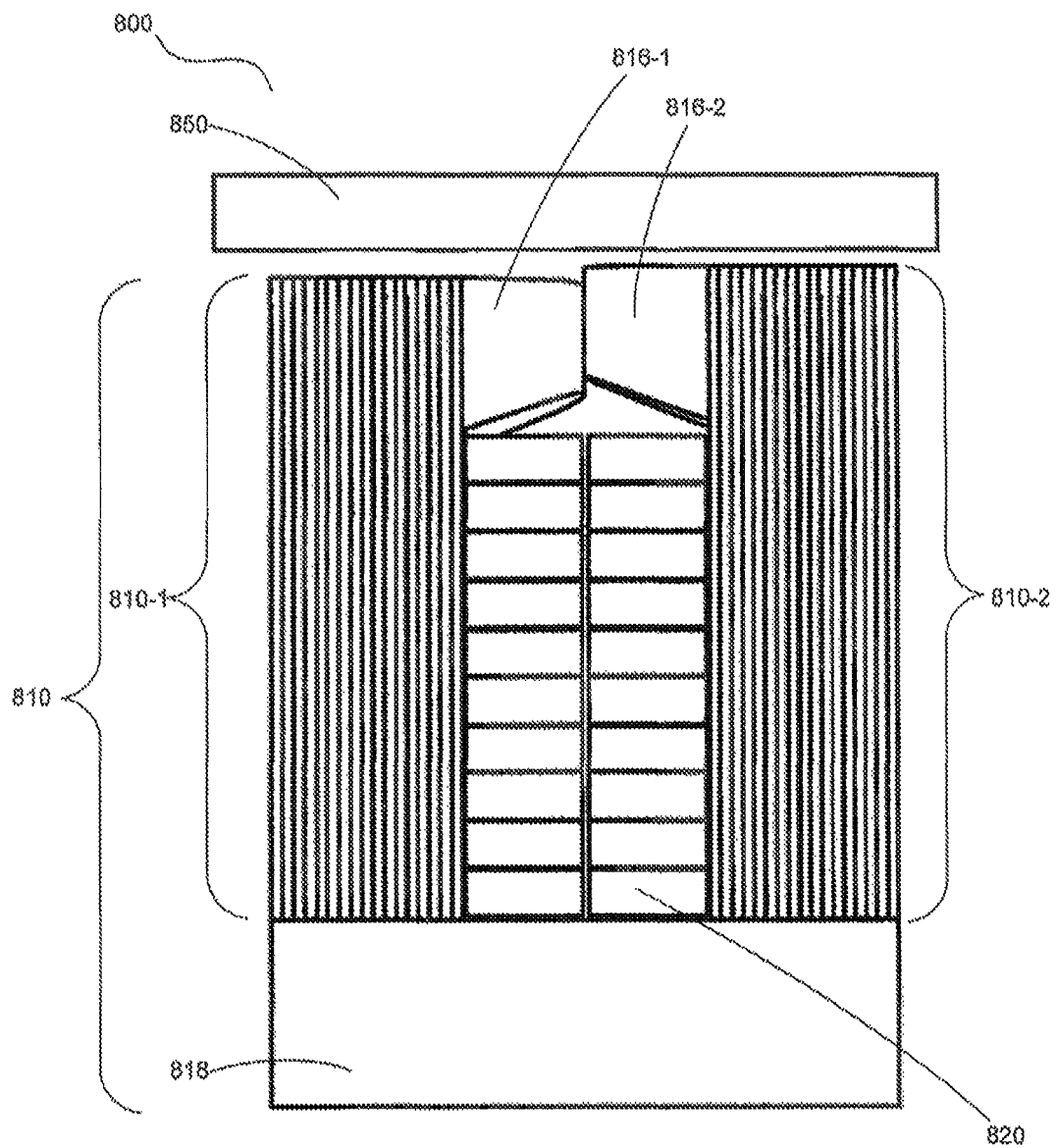
FIG. 8A is a cut-away side view illustrating an exemplary transverse flux machine in accordance with an exemplary embodiment.
Figure 8B:
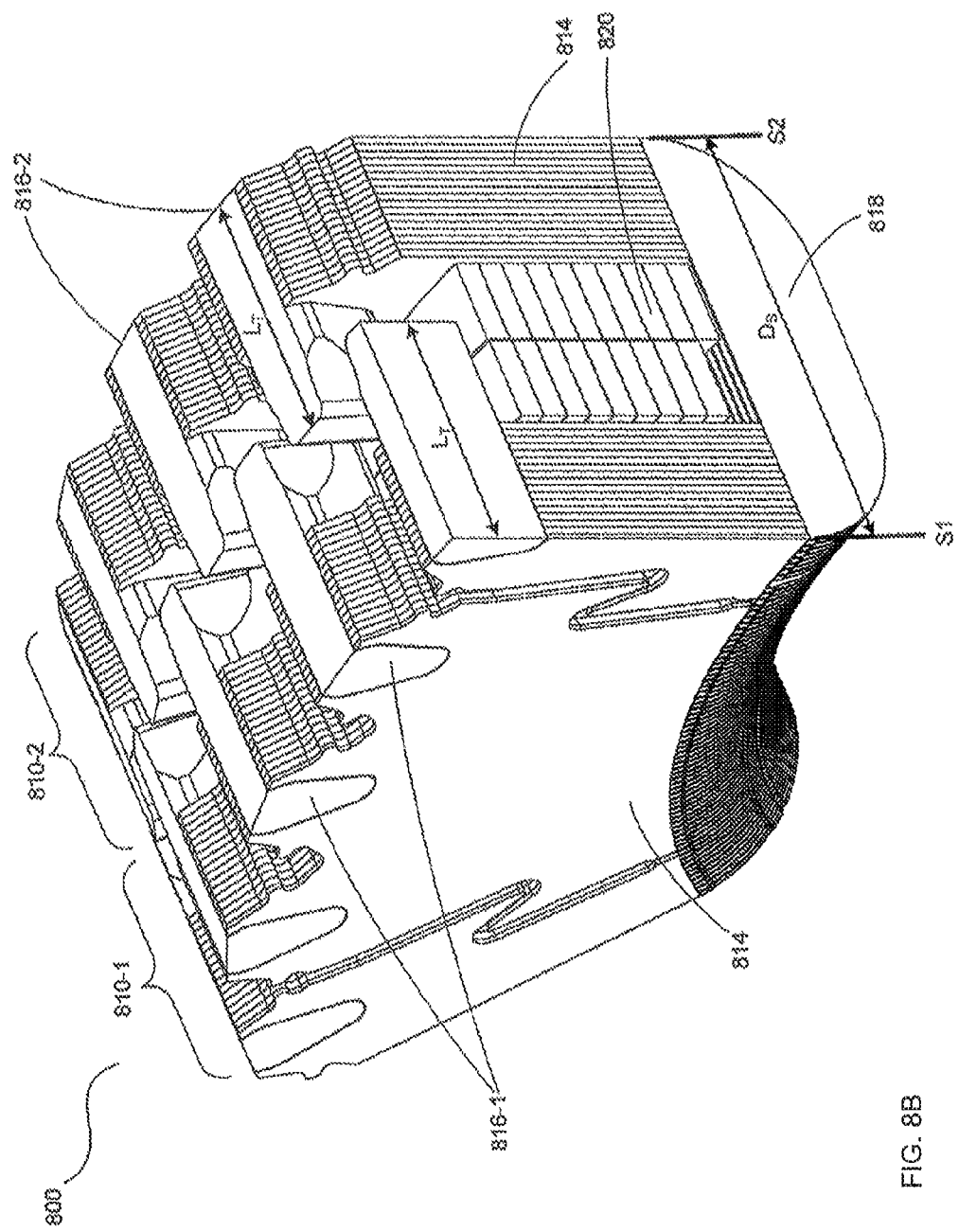
FIG. 8B is an isometric cut-away view illustrating an exemplary transverse flux machine in accordance with an exemplary embodiment.
Figure 8C:
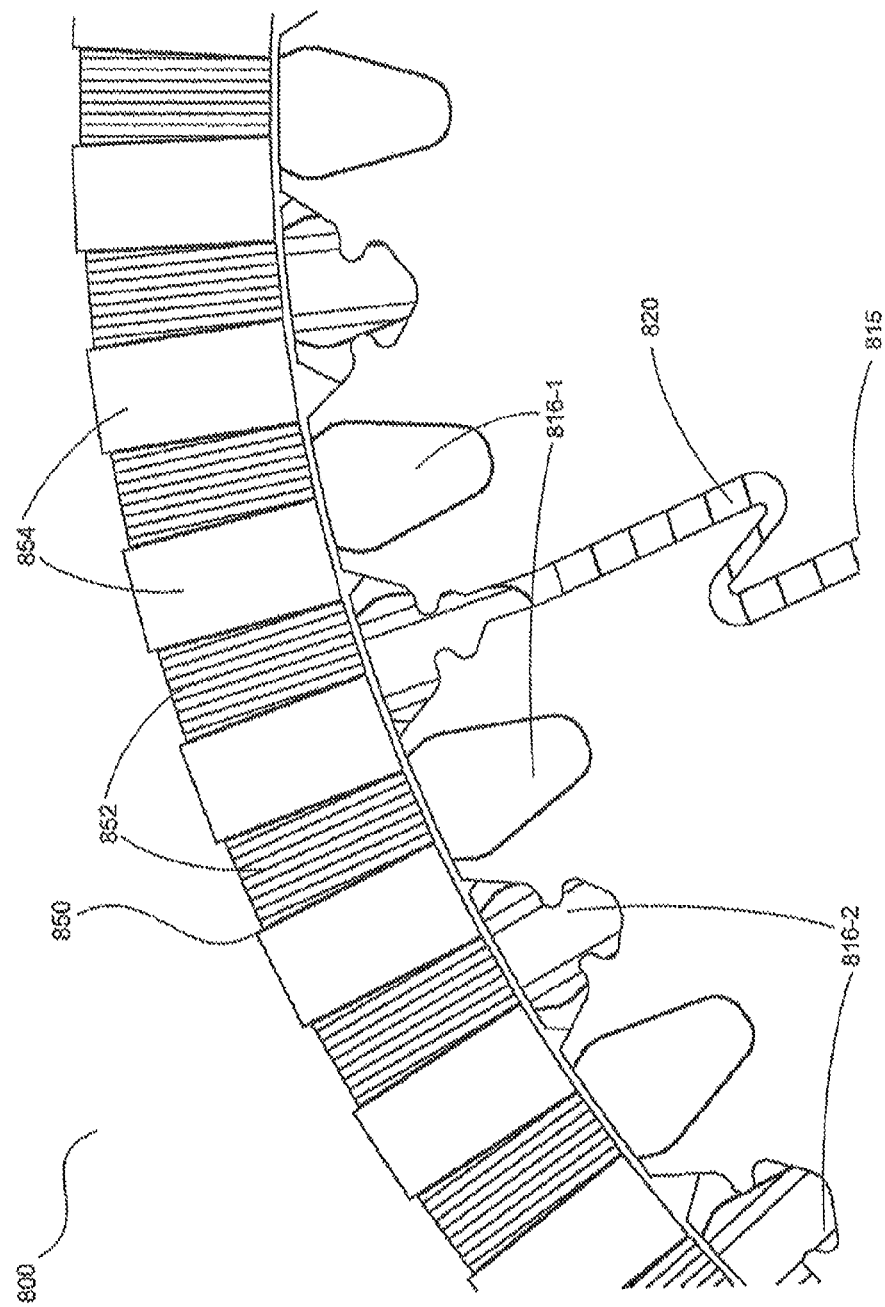
FIG. 8C is a cut-away side view illustrating a side view of an exemplary transverse flux machine in accordance with an exemplary embodiment.

Turning now to FIGS. 8A-8C, in accordance with various exemplary embodiments, an electrical machine, for example transverse flux machine 800, generally comprises a rotor 850, a stator assembly 810, and a coil 820. Moreover, transverse flux machine 800 may comprise multiple stator assemblies 810. For example, transverse flux machine 800 may comprise a single rotor 850, one or more coils 820, and one or more stator assemblies 810. Moreover, via use of a plurality of stator assemblies 810, transverse flux machine 800 may be configured to produce polyphase output and/or operate responsive to polyphase input, for example when each stator assembly 810 corresponds to a different phase.

Stator assembly 810 may be configured with any suitable shapes, geometries, and/or dimensions configured to facilitate the flow of flux around coil 820. In one exemplary embodiment, stator assembly 810 comprises stator half 810-1 and stator half 810-2 coupled by one or more back return laminations 818. In an exemplary embodiment, stator assembly 810 is configured to interface with rotor 850 in a face engaged configuration. In another exemplary embodiment, stator assembly 810 is configured to be cavity engaged with rotor 850.

In an exemplary embodiment, with reference again to FIG. 8A, stator assembly 810 may at least partially enclose coil 820. Coil 820 may be any suitable height, width, and/or length to generate an electrical current responsive to flux switching in stator assembly 810 and/or rotor 850. Coil 820 may also be any suitable height, width, and/or length configured to transfer a current to drive rotor 850. In one exemplary embodiment, the interior surface of stator assembly 810 may be configured to generally mirror the shape and size of the exterior of coil 820. In another exemplary embodiment, stator assembly 810 may be configured to be slightly larger than coil 820. Moreover, in another exemplary embodiment, stator assembly 810 is "wrapped" around coil 820 so that the interior surface of stator assembly 810 is slightly larger than the height and width of coil 820 with a minimized gap between coil 820 and stator assembly 810. Coil 820 may have any suitable length, diameter and/or other dimensions and/or geometries, as desired. In an exemplary embodiment, coil 820 is substantially circular about an axis of rotation.

In an exemplary embodiment, coil 820 is coupled to an interior surface of stator assembly 810. Coil 820 may be desirably spaced away from and/or magnetically insulated from rotor 850 and/or stator assembly 810. For example, coil 820 may be desirably spaced away from and/or magnetically insulated from rotor 850 and/or stator assembly 810 in order to reduce eddy currents and/or other induced effects in coil 820 responsive to flux switching.

In an exemplary embodiment, coil 820 is electrically coupled to a current source. The current source may be any suitable current source, but in various exemplary embodiments, the current source is alternating current.

In an exemplary embodiment, coil 820 is generally constructed from copper. However, coil 820 may be made out of any suitable electrically conductive material and/or materials such as silver, gold, aluminum, superconducting materials, and/or the like. Furthermore, coil 820 may be one solid piece, or may be made by coiling, layering, stacking, and/or otherwise joining many smaller strands or wires of electrically conductive material and/or low-loss materials together. In various exemplary embodiments, coil 820 may be dual wound, edge-wound or flat-wound, as suitable, in order to reduce eddy currents and/or other losses. Additional details regarding exemplary coil shapes and configurations are disclosed in U.S. patent application Ser. No. 12/611,737 filed on Nov. 3, 2009, now U.S. Pat. No. 7,868,508 entitled "POLYPHASE TRANSVERSE AND/OR COMMUTATED FLUX SYSTEMS", and U.S. Provisional Patent Application Ser. No. 61/414,774 filed Nov. 17, 2010 entitled "TRANSVERSE AND/OR COMMUTATED FLUX SYSTEM COIL CONCEPTS" having common ownership as the present application, the contents of each of which are hereby incorporated by reference in their entirety.

In accordance with an exemplary embodiment, stator assembly 810 and rotor 850 interact to create a magnetic flux circuit. Flux conduction is created, for example, by the switching opposite pole flux concentrators 852 of rotor 850 approaching switching surfaces 816S of teeth 816 in stator half 810-1 and 810-2 (e.g., switching surfaces 816S-1 and 816S-2). In an exemplary embodiment, opposite pole flux concentrators 852 are adjacent and interleaved in rotor 850. In various exemplary embodiments, a flux path is created through the switching elements of stator assembly 810. In an exemplary embodiment, AC synchronous flux flow is generated in response to similar flux conduction and flux paths being created simultaneously in adjacent flux concentrators 852. In another exemplary embodiment, asynchronous flux flow is generated in response to flux conduction and flux paths being created in adjacent flux concentrators 852 at slightly delayed intervals.

In an exemplary embodiment wherein transverse flux machine 800 operates as a generator, as rotor 850 moves from a first position to a second position relative to stator assembly 810, flux flows in an opposite direction within stator assembly 810, as compared to the first (prior position of rotor 850. The change in flux direction in stator assembly 810 causes the flux to be conducted around coil 820 in alternating directions. The alternating flux direction results in generation of alternating electrical output in coil 820.

In an exemplary motor embodiment, rotor 850 is driven to rotate. Rotor 850 movement is controlled, in an exemplary embodiment, by a control system which controls, for example, rotor RPM, axial positioning, acceleration, rotational direction, deceleration, starting, and/or stopping. In an exemplary embodiment, rotor 850 is driven in either direction (clockwise or counterclockwise), for example depending on a preference of an operator and/or according to programming. The control system may further comprise programming memory, and a user interface, which may include graphics. The control system may include ports for coupling to additional electrical devices and/or may be coupled to additional electrical devices wirelessly. The control system may further comprise sensors for monitoring and measuring desired values of the system. These values may include one or more of phase matching, phase propagation, input waveforms, output waveforms, flux density, voltage constant, torque constant, webers of flux switched, RPM, system malfunctions, and/or the like. A power source may be coupled to the control system. This power source may be any suitable power source for operation of the control system, such as alternating current, direct current, capacitive charge, and/or inductance. In an exemplary embodiment, the power source is a DC battery.

Portions of rotor 850 and/or stator assembly 810 may comprise any suitable flux conducting material and/or materials, such as steel, silicon steel, amorphous metals, metallic glass alloys, powdered metals such as powdered iron, and/or the like. In an exemplary embodiment, portions of transverse flux machine 800, such as portions of stator assembly 810 and/or rotor 850, may be comprised of Metglas® brand amorphous metal products produced by Hitachi Metals America, for example Metglas® brand magnetic alloy 2605SA1 and/or the like.

In an exemplary embodiment, portions of transverse flux machine 800, such as portions of magnets 854, may comprise rare earth permanent magnets. Magnetic material may comprise any suitable material, for example neodymium-iron-boron (NIB) material. In an exemplary embodiment, the rare earth permanent magnets have a suitable magnetic field, for example a field in the range of about 0.5 Tesla to about 1.5 Tesla.

In other exemplary embodiments, magnets 854 may comprise ceramic magnets, for example hard ferrites comprising iron and barium or strontium oxides. In an exemplary embodiment, magnets 854 may comprise FB9N-class material ($SrO6Fe2O3$) manufactured by TDK Corporation (Uniondale, N.Y.). In an exemplary embodiment, the ceramic magnets have a suitable magnetic field, for example a field in the range of about 0.1 Tesla to about 0.35 Tesla. In other exemplary embodiments, magnets 854 comprise inducted magnets and/or electromagnets. The inducted magnets and/or electromagnets may be made out of iron, iron alloys, metallic alloys, and/or the like, as well as other suitable materials as is known.

In various exemplary embodiments, teeth 816 are configured to reduce flux leakage in transverse flux machine 800. For example, in an exemplary embodiment teeth 816 taper towards one end in order to maintain a desired separation distance between teeth 816 in stator half 810-1 and teeth 816 in stator half 810-2. In this manner, more teeth 816 may be placed in transverse flux machine 800 while maintaining a desired minimum separation distance between teeth 816. In contrast, if teeth 816 were configured as generally non-tapering, rectangular structures, then the outer corners of adjacent teeth 816 would be closer to one another, increasing flux leakage therebetween.

In an exemplary embodiment, tooth 816 spans a distance $L_T$ from side S1 of stator assembly 810 to less than side S2 of stator assembly 810. In another exemplary embodiment, tooth 816 spans a distance $L_T$ from side S2 of stator assembly 810 to less than side S1 of stator assembly 810. In some exemplary embodiments, at least one tooth 816 spans distance $D_S$ from side S1 to side S2 of stator assembly 810.

In various exemplary embodiments, distance $L_T$ may be selected based on a number of poles in transverse flux machine 800. Stated generally, distance $L_T$ may vary in an inverse relationship with the number of poles in transverse flux machine 800. Moreover, teeth 816 in stator half 810-1 may be configured with a first distance and teeth 816 in stator half 810-2 may be configured with a second distance $L_T$. First distance $L_T$ and second distance $L_T$ may be the same, or they may differ from one another.

In an exemplary embodiment, tooth 816 spans distance $L_T$, where distance $L_T$ is at least 20 mm. In various exemplary embodiments tooth 816 spans distance $L_T$, where distance $L_T$ is between about 5 mm and about 50 mm. In other exemplary embodiments, 816 spans distance $L_T$, where distance $L_T$ is between about 4 mm and about 10 cm. Moreover, tooth 816 may span any suitable distance $L_T$. In various exemplary embodiments, tooth 816 may extend from one side of stator assembly 810 to about the middle of stator assembly 810. In these embodiments, stator assembly 810 may be understood to be configured with a stator tooth overlap of about 0%. "0% overlap" may also be understood to mean alternating teeth 816 extending from the side of stator assembly 810 to a position other than about the middle of stator assembly 810, provided teeth 816 originating on side S1 of stator assembly 810 extend to about the same location as teeth 816 originating on the opposing side (e.g., side S2) of stator assembly 810. Moreover, stator assembly 810 may be configured with any suitable amount of stator tooth overlap, as desired. Additional details regarding stator tooth overlap are disclosed in U.S. patent application Ser. No. 12/772,958 filed on May 3, 2010, entitled "TRANSVERSE AND/OR COMMUTATED FLUX SYSTEMS CONFIGURED TO PROVIDE REDUCED FLUX LEAKAGE, HYSTERESIS LOSS REDUCTION, AND PHASE MATCHING" having common ownership as the present application, the contents of which are hereby incorporated by reference in their entirety.

In various exemplary embodiments, tooth 816 decreases in thickness (e.g., tapers and/or otherwise varies in one or more dimensions) as tooth 816 extends from one side of stator assembly 810 toward the other side of stator assembly 810. In an exemplary embodiment, tooth 816 is configured with a substantially constant thickness where tooth 816 contacts lamination stack 814, and with a variable thickness (e.g., taper) in the area where tooth 816 extends beyond the edge of lamination stack 814. In other exemplary embodiments, tooth 816 is configured with constant thickness as tooth 816 extends from one side of stator assembly 810 toward the other side of stator assembly 810.

In an exemplary embodiment, the size of the air gap between stator assembly 810 and rotor 850 is substantially constant across switching surfaces on rotor 850. In an alternative embodiment, the size of the air gap between stator assembly 810 and rotor 850 may be variable over switching surfaces on rotor 850.

In various exemplary embodiments, tooth 816 is configured to facilitate flow of flux in one or more directions, including a radial direction, a rotational direction, and/or an axial direction in transverse flux machine 800. In contrast, lamination stacks 814 are configured to facilitate flow of flux generally in a radial direction (and/or to a lesser degree, a rotational direction). Moreover, back return laminations 818 are configured to facilitate flow of flux generally in an axial direction (and/or to a lesser degree, a radial direction).

Figure 8D:
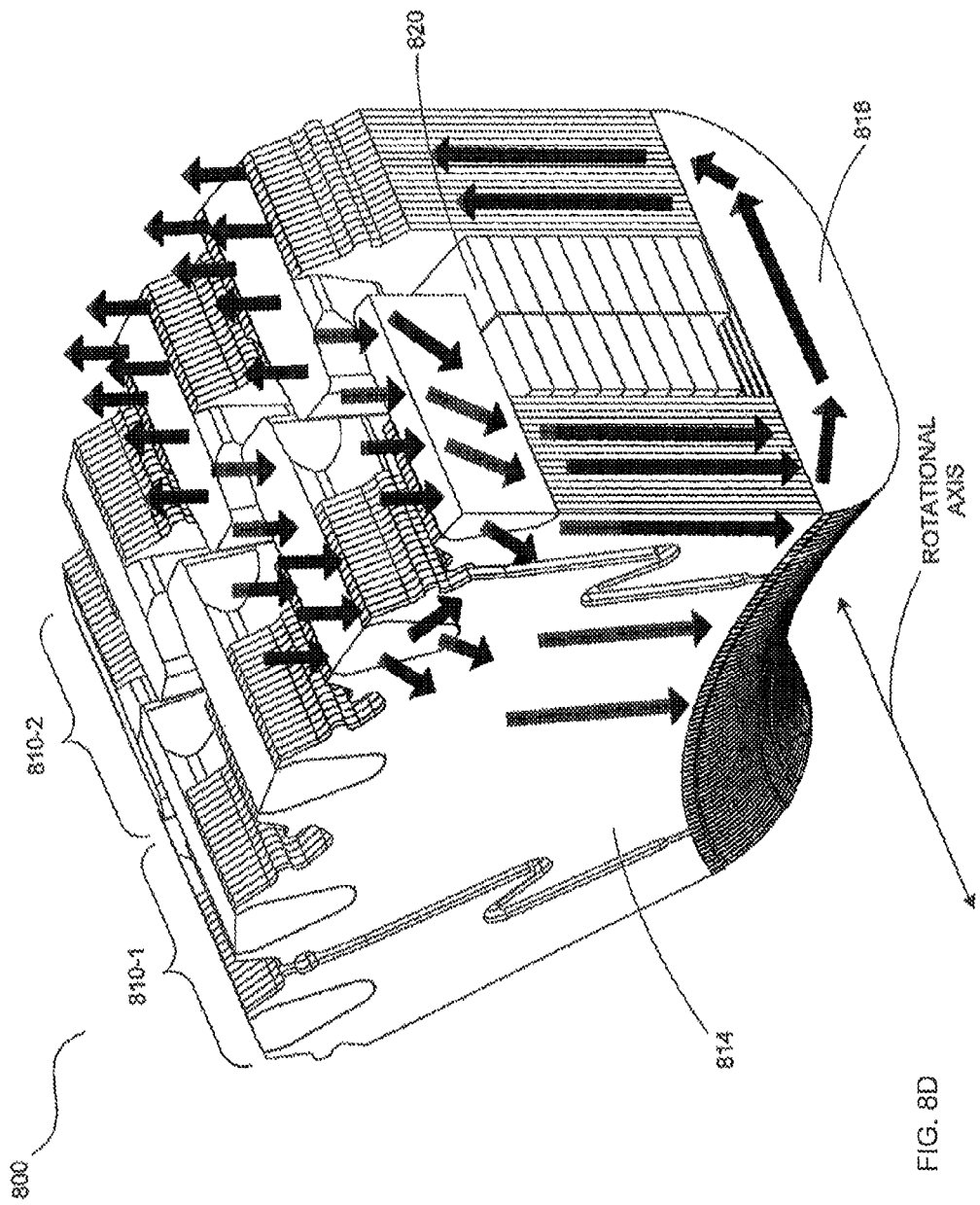
FIGS. 8D and 8E are cut-away isometric views illustrating flux flow in an exemplary transverse flux machine in accordance with an exemplary embodiment.

With additional reference now to FIGS. 8B and 8D, in various exemplary embodiments, in a first position of rotor 850, teeth 816-1 of stator half 810-1 receive flux via their respective switching surfaces 816S-1, and concentrate and distribute the flux across the side laminations of one or more lamination stacks 814. Similarly, teeth 816-2 of stator half 810-2 receive flux from the side laminations of one or more lamination stacks 814, and transfer flux to rotor 850 via their respective switching surfaces 816S-2.

Figure 8E:
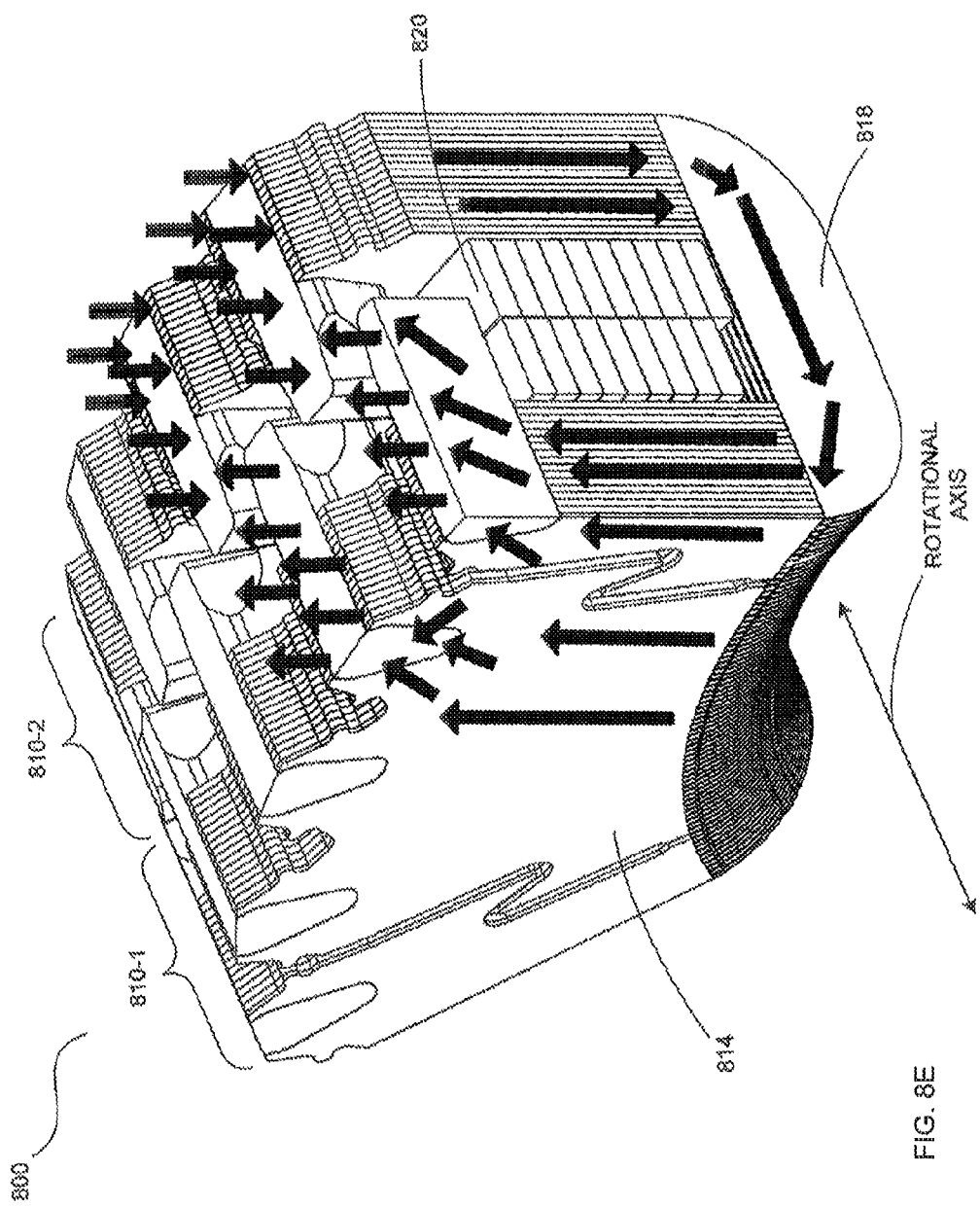

With additional reference now to FIG. 8E, in a second position of rotor 850, the direction of flux is generally reversed within transverse flux machine 800. In this manner, flux may be repeatedly switched around coil 820, for example as rotor 850 alternates between a first position and a second position. It will be appreciated that the arrows representing flux flow in FIGS. 8D and 8E are not intended to be precise or exhaustive, and many additional flux paths may exist in a practical transverse flux machine and/or commutated flux machine In various exemplary embodiments, tooth 816 may be configured to act as a flux concentrator, increasing the amount of flux switched in transverse flux machine 800. For example, tooth 816 generally switches more flux across an air gap in a transverse flux machine than an alternative approach wherein no flux switching components extend beyond the edge of lamination stack 814 nearest the coil.

In various exemplary embodiments, a transverse flux machine may be configured with various sensors, including torque sensors, strain gauges, Hall effect sensors, temperature sensors, and/or the like, in order to facilitate operation and/or characterization and assessment of the transverse flux machine. Additional details regarding adjustable Hall effect sensor systems are disclosed in a U.S. Provisional Patent Application entitled "ADJUSTABLE HALL EFFECT SENSOR SYSTEM" having the same filing date and common ownership as the present application, the contents of which are hereby incorporated by reference in their entirety.

Additional details regarding utilization of transverse flux machines and/or commutated flux machines in electric bicycles and other light electric vehicles are disclosed in U.S. patent application Ser. No. 12/772,959 filed on May 3, 2010, entitled "TRANSVERSE AND/OR COMMUTATED FLUX SYSTEMS FOR ELECTRIC BICYCLES" having common ownership as the present application, the contents of which are hereby incorporated by reference in their entirety.

In accordance with principles of the present disclosure, a transverse flux machine and/or commutated flux machine may desirably be utilized to provide mechanical output to relatively lightweight vehicles such as bicycles, scooters, motorcycles, quads, golf carts, or other vehicles. Moreover, a transverse flux machine and/or commutated flux machine may desirably be utilized to power an automobile, a truck, bus, or other passenger vehicle. Additionally, a transverse flux machine and/or commutated flux machine may desirably be utilized in small engine applications, for example portable generators, power tools, and other electrical equipment. A transverse flux machine and/or commutated flux machine may desirably be utilized to provide mechanical output to propeller-driven devices, for example boats, airplanes, and/or the like. A transverse flux machine and/or commutated flux machine may also desirably be utilized in various machine tools, for example rotating spindles, tables configured to move large masses, and/or the like. In general, transverse flux machines and/or commutated flux machines may be utilized to provide electrical and/or mechanical input and/or output to and/or from any suitable devices.

Figure 9:
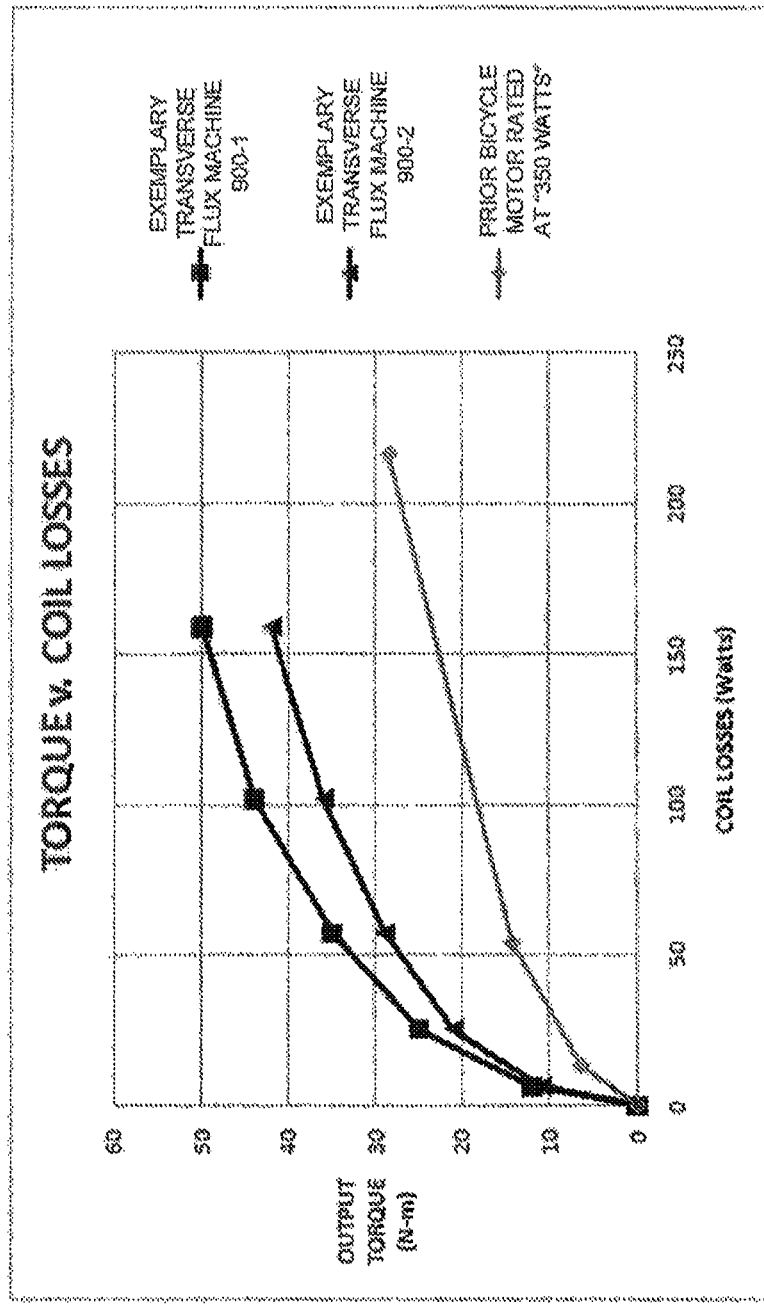
FIG. 9 is a graph illustrating performance of exemplary transverse flux machines in accordance with an exemplary embodiment.

In accordance with various exemplary embodiments, turning now to FIG. 9, a polyphase transverse flux machine configured in accordance with principles of the present disclosure, for example transverse flux machine 900 configured as a bicycle hub motor, may be configured with improved performance characteristics when compared to existing motors, such as prior art bicycle hub motors.

For example, a transverse flux machine (TFM) configured as a bicycle hub motor and configured in accordance with various principles of the present disclosure, for example transverse flux machine 900-1 and/or transverse flux machine 900-2, achieve higher output torque at a similar level of resistive coil losses compared to a prior art motor. Stated another way, transverse flux machine 900-1 and/or 900-2 can achieve a similar level of output torque compared to a prior art motor while incurring lower resistive coil losses. In an exemplary embodiment, transverse flux machine 900-1 is configured with an air gap of about 0.381 mm (0.015 inches). In an exemplary embodiment, transverse flux machine 900-2 is configured with an air gap of about 0.508 mm (0.020 inches).

With continued reference to FIG. 9, a prior art bicycle motor achieves an output torque of about 14 Newton-meters while incurring resistive coil losses of about 50 watts. In contrast, TFM 900-1 achieves an output torque of about 15 Newton-meters while incurring resistive coil losses of only about 10 watts. Moreover, TFM 900-2 achieves an output torque of about 15 Newton-meters while incurring resistive coil losses of only about 11 watts. Because TFM 900-1 and TFM 900-2 incur lower resistive coil losses when operated at a similar level of output torque as a prior art motor, TFM 900-1 and TFM 900-2 operate at reduced temperatures.

Moreover, in various exemplary embodiments, TFM 900-1 and TFM 900-2 can offer torque output levels that a prior art motor simply cannot achieve. Moreover, TFM 900-1 and 900-2 may offer continuous, thermally stable output torque levels that exceed the peak torque achievable a prior art motor. Continuing to reference FIG. 9, the prior art motor is unable to generate output torque of beyond about 30 Newton-meters, and operation at this level results in massive resistive coil losses of more than 200 watts. Such large resistive coil losses will typically quickly result in thermal degradation and/or thermal failure of the motor. In contrast, TFM 900-1 achieves an output torque of about 30 Newton-meters while incurring resistive coil losses of about 40 watts. Yet further, TFM 900-2 achieves an output torque of about 30 Newton-meters while incurring resistive coil losses of only about 70 watts.

Moreover, TFM 900-1 achieves an output torque of about 44 Newton-meters while incurring resistive coil losses of about 100 watts. TFM 900-1 may be thermally stable at this level of resistive coil loss, and thus TFM 900-1 may be configured with a continuous, thermally stable torque density exceeding the peak torque of a prior art bicycle hub motor.

Moreover, TFM 900-2 achieves an output torque of about 35 Newton-meters while incurring resistive coil losses of about 100 watts. TFM 900-2 may be thermally stable at this level of resistive coil loss, and thus TFM 900-2 may be configured with a continuous, thermally stable torque density exceeding the peak torque of a prior art bicycle hub motor.

As can be appreciated, utilizing an electric motor configured in accordance with principles of the present disclosure, for example TFM 900-1 and/or TFM 900-2 having the ability to produce higher torque at a given level of resistive coil losses compared to a prior art motor, allows an electric bicycle to travel further on a comparable battery charge, to climb a wider range of grades and engage headwinds more effectively, and to propel heavier riders and vehicles.

In various exemplary embodiments, transverse flux machines and/or commutated flux machines configured in accordance with principles of the present disclosure may be utilized as motors for light electric vehicles, for example as motors for electric bicycles.

In an exemplary embodiment, a transverse flux machine be coupled to a wheel, for example a bicycle wheel. A transverse flux machine may also be coupled to gear cassette and/or other suitable components in order to allow the transverse flux machine to interface with various driveline and/or control components of a bicycle or other light electric vehicle (e.g., brake calipers, foot pedals, chains, belts, and/or the like).

In various exemplary embodiments, a transverse flux machine is configured to be located in the same location as and/or replace the hub of a wheel, such as an e-bike wheel. Stated another way, in certain exemplary embodiments a transverse flux machine may be no wider along the axis of rotation than an available distance in a wheel, for example the distance between a gear cassette and a brake disc of a bicycle. Moreover, in many exemplary embodiments a transverse flux machine may be configured to be lightweight, for example having a total mass of less than about 5 kilograms including all structural, mechanical, electrical, and magnetic components. Additionally, a transverse flux machine may be configured to be compact, for example having a volume less than 2,000 cubic centimeters (cc), less than 1000 cc, and/or less than 750 cc. Yet further, transverse flux machine may be configured to utilize a suitable mass of active electrical and/or magnetic components, for example between about 3.3 kilograms and about 4 kilograms of active electrical and/or magnetic components. In an exemplary embodiment, a transverse flux machine is configured with a total mass of about 4.7 kilograms, and a mass of about 3.5 kilograms of active electrical and/or magnetic components.

Principles of the present disclosure may suitably be combined with various other principles related to transverse flux machines and/or commutated flux machines. For example, principles of the present disclosure may suitably be combined with principles for stators in transverse flux machines and commutated flux machines, for example principles for partial stators and/or gapped stators, as disclosed in U.S. patent application Ser. No. 12/611,728 filed on Nov. 3, 2009, now U.S. Pat. No. 7,851,965 entitled "TRANSVERSE AND/OR COMMUTATED FLUX SYSTEM STATOR CONCEPTS" having common ownership as the present application, the contents of which are hereby incorporated by reference in their entirety.

Principles of the present disclosure may also suitably be combined with principles for rotors in transverse flux machines and/or commutated flux machines, for example tape wound rotors and/or multipath rotors, as disclosed in U.S. patent application Ser. No. 12/611,733 filed on Nov. 3, 2009, now U.S. Patent Application Publication No. 2010/0109452, entitled "TRANSVERSE AND/OR COMMUTATED FLUX SYSTEM ROTOR CONCEPTS" having common ownership as the present application, the contents of which are hereby incorporated by reference in their entirety.

Principles of the present disclosure may also suitably be combined with principles of polyphase transverse flux machines and/or polyphase commutated flux machines as disclosed in U.S. patent application Ser. No. 12/611,737 filed on Nov. 3, 2009, now U.S. Pat. No. 7,868,508 entitled "POLYPHASE TRANSVERSE AND/OR COMMUTATED FLUX SYSTEMS" having common ownership as the present application, the contents of which are hereby incorporated by reference in their entirety.

Principles of the present disclosure may also suitably be combined with principles of extended magnets, overhung rotors, and/or stator tooth overlap in transverse flux machines and/or commutated flux machines as disclosed in U.S. patent application Ser. No. 12/772,958 filed on May 3, 2010, entitled "TRANSVERSE AND/OR COMMUTATED FLUX SYSTEMS CONFIGURED TO PROVIDE REDUCED FLUX LEAKAGE, HYSTERESIS LOSS REDUCTION, AND PHASE MATCHING" having common ownership as the present application, the contents of which are hereby incorporated by reference in their entirety.

Principles of the present disclosure may also suitably be combined with principles of utilization of transverse flux machines and/or commutated flux machines in electric bicycles as disclosed in U.S. patent application Ser. No. 12/772,959 filed on May 3, 2010, entitled "TRANSVERSE AND/OR COMMUTATED FLUX SYSTEMS FOR ELECTRIC BICYCLES" having common ownership as the present application, the contents of which are hereby incorporated by reference in their entirety.

Principles of the present disclosure may also suitably be combined with principles of phase offset in transverse flux machines and/or commutated flux machines as disclosed in U.S. patent application Ser. No. 12/772,962 filed on May 3, 2010, entitled "TRANSVERSE AND/OR COMMUTATED FLUX SYSTEM PHASE OFFSET" having common ownership as the present application, the contents of which are hereby incorporated by reference in their entirety.

Principles of the present disclosure may also suitably be combined with principles of segmented stator laminations and/or rainbow laminations in transverse flux machines and/or commutated flux machines as disclosed in U.S. Provisional Patent Application No. 61/414,769 filed Nov. 17, 2010 and entitled "TRANSVERSE AND/OR COMMUTATED FLUX SYSTEMS HAVING SEGMENTED STATOR LAMINATIONS" having common ownership as the present application, the contents of which are hereby incorporated by reference in their entirety.

Principles of the present disclosure may also suitably be combined with principles of adjustable Hall effect sensor systems as disclosed in a U.S. Provisional Patent Application No. 61/414,769 filed Nov. 17, 2010 and entitled "TRANSVERSE AND/OR COMMUTATED FLUX SYSTEMS HAVING SEGMENTED STATOR LAMINATIONS" having common ownership as the present application, the contents of which are hereby incorporated by reference in their entirety.

Principles of the present disclosure may also suitably be combined with principles of coils, including dual wound coils in transverse flux machines and/or commutated flux machines as disclosed in U.S. Provisional Patent Application No. 61/414,774 filed Nov. 17, 2010 and entitled "TRANSVERSE AND/OR COMMUTATED FLUX SYSTEM COIL CONCEPTS" having common ownership as the present application, the contents of which are hereby incorporated by reference in their entirety.

Principles of the present disclosure may also suitably be combined with principles of laminations combined with powdered metal portions in transverse flux machines and/or commutated flux machines as disclosed in U.S. Provisional Patent Application No. 61/414,781 filed Nov. 17, 2010 and entitled "TRANSVERSE AND/OR COMMUTATED FLUX SYSTEMS HAVING LAMINATED AND POWDERED METAL PORTIONS" having common ownership as the present application, the contents of which are hereby incorporated by reference in their entirety.

Principles of the present disclosure may also suitably be combined with principles of adjustable Hall effect sensor systems as disclosed in a U.S. Provisional Patent Application entitled "ADJUSTABLE HALL EFFECT SENSOR SYSTEM" having the same filing date and common ownership as the present application, the contents of which are hereby incorporated by reference in their entirety.

Principles of the present disclosure may also suitably be combined with principles of isolated torque sensing systems as disclosed in a U.S. Provisional Patent Application entitled "ISOLATED TORQUE SENSOR" having the same tiling date and common ownership as the present application, the contents of which are hereby incorporated by reference in their entirety.

Moreover, principles of the present disclosure may suitably be combined with any number of principles disclosed in any one of and/or all of the U.S. Patents and/or patent applications incorporated by reference herein. Thus, for example, a particular transverse flux machine and/or commutated flux machine may incorporate use of segmented stator laminations, use of rainbow laminations, use of a dual wound coil, use of a lamination stack with powdered metal teeth, use of a sixth-phase offset, use of extended magnets, use of an overhung rotor, use of stator tooth overlap, use of a tape wound rotor, use of a multipath rotor, use of a partial stator, use of a polyphase design, use of a torque sensor, use of an adjustable Hall effect sensor system, and/or the like. All such combinations, permutations, and/or other interrelationships are considered to be within the scope of the present disclosure.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. An electrical machine, comprising:
   a rotor;
   a coil; and
   a stator comprising a lamination stack coupled to a tooth,
   wherein, the electrical machine is at least one of a transverse flux machine or a commutated flux machine; and
   wherein the lamination stack is configured with a flux switch area comprising:
   a surface of the tooth facing the rotor; and
   at least one switch edge comprising a portion of the lamination stack disposed on one side of the tooth in a rotational direction of the rotor.

2. The electrical machine of claim 1, wherein the transverse flux machine is configured in a radial gap configuration.

3. The electrical machine of claim 1, wherein the transverse flux machine is configured in a face engaged configuration.

4. The electrical machine of claim 1, wherein the transverse flux machine is configured in an outer rotating motor configuration.

5. The electrical machine of claim 1, comprising:
   a first switch edge comprising a portion of the lamination stack disposed on one side of the tooth in a rotational direction of the rotor; and
   a second switch edge comprising a portion of the lamination stack disposed on the opposite side of the tooth in a rotational direction of the rotor.

6. The electrical machine of claim 5, wherein the flux switch area is composed of at least 5% the area of the first switch edge, and at least 5% the area of the second switch edge.

7. The electrical machine of claim 1, wherein the flux switch area is configured to providing a constant air gap.

8. The electrical machine of claim 1, wherein the flux switch area is configured with a switch width (SW) comprising a tooth width (TW), wherein the tooth width is between 2% and 95% the switch width.

9. The electrical machine of claim 8 wherein the tooth width Tw is between 95% of switch width SW and 50% of switch width SW.

10. The electrical machine of claim 8, wherein the tooth with TW is no more than 50% of switch width SW.

11. The electrical machine of claim 8, wherein the tooth width TW is no more than ten percent of switch width.

12. The electrical machine of claim 1, wherein lamination stack is configured with a plurality of trenches, wherein a trench is configured to receive a tooth.

13. The electrical machine of claim 12, wherein the lamination stack comprises a cavity between two of the plurality of trenches, and wherein the cavity is configured to mechanically retain an adhesive.

14. The electrical machine of claim 1, wherein the stator comprises:
   a first stator half, comprising
      a plurality of lamination stacks forming a lamination ring; and
      a plurality of teeth coupled to the lamination ring,
   wherein, in a first position of a rotor flux is transferred from the plurality of teeth to the rotor, and wherein, in a second position of the rotor, flux is transferred from the rotor to the plurality of teeth.

15. The electrical machine of claim 1, wherein the tooth width is tapered in an axial direction in order to reduce flux leakage.

16. The electrical machine of claim 1, wherein the stator comprises a plurality of teeth configured according to a sixth-phase offset.

17. The electrical machine of claim 1, wherein the electrical machine is a polyphase machine.

18. The electrical machine of claim 1, further comprising an adjustable Hall effect sensor system coupled to the stator.

19. The electrical machine of claim 1, wherein a radial edge surface of a tooth is at least partially covered by a lamination stack that extends to a switching surface.

20. An electrical machine, comprising:
 a rotor;
 a coil; and
 a stator comprising:
  a lamination stack coupled to a tooth, and
  a first stator half, comprising
   a plurality of lamination stacks forming a lamination ring, and
   a plurality of teeth coupled to the lamination ring; and
 a back return lamination coupling the first stator half to a second stator half;
 wherein, in a first position of a rotor flux is transferred from the plurality of teeth to the rotor, and wherein, in a second position of the rotor, flux is transferred from the rotor to the plurality of teeth; and
 wherein, the electrical machine is at least one of a transverse flux machine or a commutated flux machine.

\* \* \* \* \*